(12) United States Patent
Hussain

(10) Patent No.: US 10,330,033 B2
(45) Date of Patent: Jun. 25, 2019

(54) METHOD AND SYSTEM FOR EXHAUST HEAT RECOVERY

(71) Applicant: Ford Global Technologies, LLC, Dearborn, MI (US)

(72) Inventor: Quazi Ehtesham Hussain, Holland, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 15/367,038

(22) Filed: Dec. 1, 2016

(65) Prior Publication Data

US 2018/0156143 A1 Jun. 7, 2018

(51) Int. Cl.
| | |
|---|---|
| *F01N 5/02* | (2006.01) |
| *F01N 13/00* | (2010.01) |
| *F01N 13/08* | (2010.01) |
| *F01N 13/16* | (2010.01) |
| *F02D 41/00* | (2006.01) |
| *F02D 41/06* | (2006.01) |
| *F02D 41/14* | (2006.01) |
| *F02D 41/26* | (2006.01) |
| *F02M 35/104* | (2006.01) |

(52) U.S. Cl.
CPC ........... *F02D 41/0055* (2013.01); *F01N 5/02* (2013.01); *F01N 13/008* (2013.01); *F01N 13/08* (2013.01); *F02D 41/0077* (2013.01); *F02D 41/26* (2013.01); *F02M 35/104* (2013.01); *F01N 13/16* (2013.01); *F01N 2240/02* (2013.01); *F01N 2240/10* (2013.01); *F02D 41/064* (2013.01); *F02D 41/1446* (2013.01); *F02D 41/1448* (2013.01); *Y02T 10/16* (2013.01)

(58) Field of Classification Search
CPC .......... F01N 13/008; F01N 13/08; F01N 5/02; F01N 13/16; F01N 2240/02; F01N 2240/10; F02D 41/0055; F02D 41/0077; F02D 41/26; F02D 41/064; F02D 41/1446; F02D 41/1448; F02M 35/104
See application file for complete search history.

(56) References Cited

U.S. PATENT DOCUMENTS

| | | | |
|---|---|---|---|
| 6,253,548 B1 * | 7/2001 | Ap | F01N 3/2006 60/320 |
| 8,100,216 B2 | 1/2012 | Bartilson | |
| 2013/0219872 A1 * | 8/2013 | Gibble | F01K 15/02 60/320 |
| 2015/0143811 A1 * | 5/2015 | Pang | F01N 3/20 60/772 |

* cited by examiner

*Primary Examiner* — Brandon D Lee
(74) *Attorney, Agent, or Firm* — Julia Voutyras; McCoy Russell LLP

(57) ABSTRACT

Methods and systems are provided for exhaust gas heat recovery using a bottoming cycle comprising an exhaust heat exchanger. In one example, a method may include maintaining a target thermal energy input to the heat exchanger by opportunistically flowing exhaust through the heat exchanger after storing a portion of thermal energy from the exhaust in a thermal storage device or prior to flowing exhaust through the heat exchanger, heating the exhaust by drawing thermal energy from the thermal storage device.

20 Claims, 8 Drawing Sheets

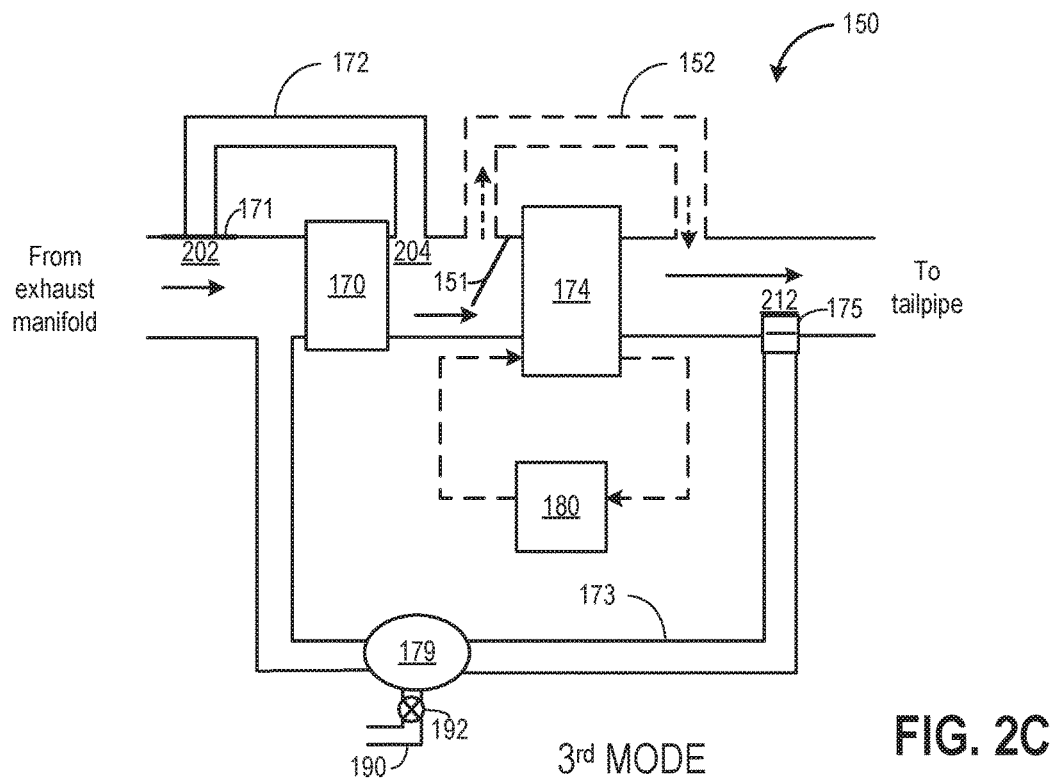
FIG. 2C — 3rd MODE
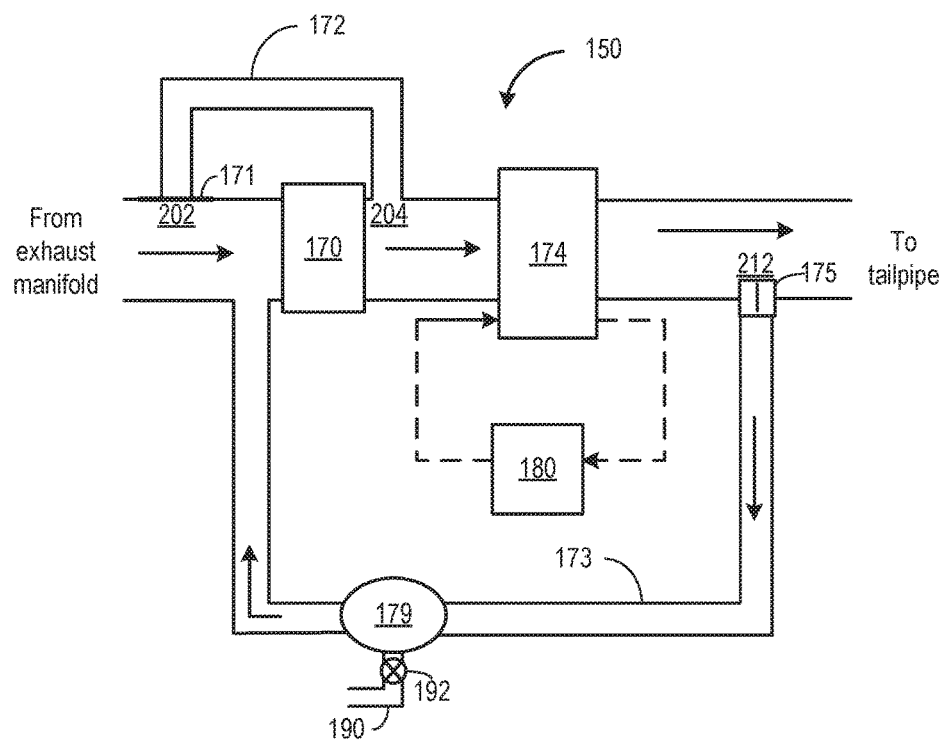
FIG. 2D — 4th MODE

5th MODE

METHOD AND SYSTEM FOR EXHAUST HEAT RECOVERY

FIELD

The present description relates generally to methods and systems for exhaust gas heat recovery using a bottoming cycle.

BACKGROUND/SUMMARY

Engines may be configured with an exhaust heat recovery system for recovering heat from exhaust generated in an internal combustion engine. The heat recovered by an exhaust heat exchanger may be converted to electrical energy and stored in a system battery. Electrical energy from the battery may be opportunistically utilized for functions such as operating a motor of a compressor, operating a pump, cylinder head heating, vehicle cabin heating and lighting, etc., thereby improving engine and fuel efficiency.

Various approaches are provided for exhaust heat recovery. In one example, as shown in US 20130219872, Gibble et al. discloses a heat recovery and thermal management system including a thermoelectric device used for recovering heat from exhaust gas and converting the heat to electrical energy. A bottoming cycle, such as a Rankine cycle, is used in the heat recovery system for electricity generation. The electrical energy produced from the exhaust heat is stored in a battery and later used for functions such as vehicle cabin heating.

However, the inventors herein have recognized potential disadvantages with the above approach. As one example, for efficient operation of a bottoming cycle, such a Rankine cycle, a steady supply of exhaust thermal energy that is within a target energy range is required to maintain a higher than threshold pressure ratio at the expander of the bottoming cycle. The exhaust thermal energy may be determined as a function of the exhaust temperature and the exhaust flow-rate. In Gibble et al., during conditions when there is a lower than target supply of exhaust thermal energy, the bottoming cycle efficiency may decrease. During conditions when there is a higher than target flux of exhaust heat, heat recovery may be limited by the size of the bottoming cycle components. In particular, in order to recover the higher levels of heat, larger bottoming cycle components, such as a larger expander, a larger compressor, and/or a larger (or more powerful) pump may have to be used. However, such larger components may have a higher thermal inertia, causing energy losses, and may also increase component cost along with packaging concerns. If thermoelectric components are used for exhaust heat recovery, higher than target exhaust thermal energy may cause damage to the thermally sensitive components. In order to reduce fluctuations in exhaust thermal energy from reaching the bottoming cycle components, a bypass passage of the heat exchanger may be used to route exhaust during conditions when the exhaust thermal energy is outside the target range. However, when exhaust bypasses the bottoming cycle components, exhaust heat available for recovery decreases.

The inventors herein have identified an approach by which the issues described above may be at least partly addressed. One example method comprises: when exhaust thermal energy is higher than a first threshold, flowing exhaust through a heat exchanger after storing a portion of the thermal energy at a thermal energy storage device upstream of the heat exchanger; and when exhaust thermal energy is lower than a second threshold, flowing exhaust through the heat exchanger after drawing thermal energy from the thermal energy storage device. In this way, by opportunistically storing energy from exhaust in a thermal storage device and subsequently using that energy to maintain a steady supply of exhaust thermal energy at the heat exchanger, exhaust heat recovery efficiency may be increased.

In one example, the engine exhaust system may be configured with a post-catalyst thermal storage device and a heat exchanger coupled to an exhaust passage leading to a tailpipe. The heat exchanger may be part of a bottoming cycle, the bottoming cycle further comprising an expander (such as a turbine), a condenser, and a pump. A bypass passage may be coupled to the exhaust passage across the thermal storage device, enabling post-catalyst exhaust to be routed to the heat exchanger bypassing the thermal storage device. A recirculation passage may be coupled to the exhaust passage from downstream of the heat exchanger to upstream of the thermal storage device. Routing of exhaust to the heat exchanger may be adjusted based on the exhaust thermal energy, estimated as a function of the exhaust temperature and exhaust flow-rate, so that the thermal energy reaching the heat exchanger can be maintained within a target energy range. During conditions when the exhaust thermal energy is within the target range, exhaust may be directly routed to the heat exchanger via the bypass passage. Exhaust heat recovered at the heat exchanger may be converted to electrical energy at the bottoming cycle, and the electrical energy may be stored in the battery for later use. Also during engine cold-start conditions, the entire volume of exhaust may be directly routed through the heat exchanger to expedite cold-start exhaust heat recovery for engine heating. During conditions when the exhaust thermal energy is higher than the target range, a first portion of exhaust corresponding to the excess thermal energy may be routed through the thermal storage device, and the excess thermal energy may be stored at the thermal storage device. A remaining second portion of exhaust, corresponding to the target range thermal energy, may be routed to the heat exchanger via the bypass passage. Alternatively, the entire volume of exhaust may be routed via the thermal storage device wherein exhaust heat may be stored until its storage capacity is reached. During conditions when the exhaust thermal energy is lower than the target range (such as when the exhaust temperature is low or when the exhaust flow rate is low), a portion of cooled exhaust may be recirculated from downstream of the heat exchanger to upstream of the thermal storage device via the recirculation passage. The portion of exhaust may then be heated by withdrawing thermal energy inform the thermal storage device, the heated exhaust then combining with fresh exhaust before flowing through the heat exchanger. During conditions when the exhaust thermal energy is lower than the target range due to low exhaust flow rates, in addition to the recirculation of exhaust, ambient air may be drawn into the recirculation passage using a blower, and the air-exhaust mixture may be heated by withdrawing heat from the thermal storage device before flowing through the heat exchanger.

In this way, by selectively adjusting exhaust flow through an exhaust heat exchanger, a steady supply of exhaust thermal energy that is within a target energy range may be provided to the heat exchanger. The technical effect of maintaining a steady supply of exhaust thermal energy is that a target pressure ratio may be maintained at the expander of the bottoming cycle, thereby maintaining the efficiency of the bottoming cycle. The technical effect of opportunistically storing excess exhaust energy in a thermal storage device is that during low exhaust thermal energy conditions, thermal energy previously stored in the thermal storage device may be used to heat a part of the exhaust entering the heat exchanger, thereby raising the exhaust thermal energy to the target range, and enabling the steady flow of exhaust energy to be maintained at the heat exchanger and the bottoming cycle. By drawing in ambient air during low exhaust flow rate conditions, and heating the ambient air-exhaust mixture using energy stored at the thermal storage device, the exhaust flow-rate through the heat exchanger may be raised and the thermal energy of the exhaust reaching the heat exchanger may be maintained at the desired level. By maintaining the exhaust thermal energy reaching the heat exchanger within a target range by opportunistically storing and withdrawing energy at/from a thermal storage device, the bottoming cycle coupled to the heat exchanger may be efficiently operated for electrical energy generation over a wider range of vehicle operating conditions, including during engine-off periods in hybrid electric vehicles. In addition, a higher efficiency may be achieved while relying on smaller and lighter components. By storing exhaust heat as electrical energy in a battery, exhaust heat that would have otherwise been wasted may be effectively used for operating pumps, providing heat to vehicle components, operating motors, etc. Overall, by enhancing exhaust heat recovery, engine performance and fuel efficiency are improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2C shows the exhaust heat recovery system of FIG. 1 operating in a third mode.

FIG. 2D shows the exhaust heat recovery system of FIG. 1 operating in a fourth mode.

DETAILED DESCRIPTION

Figure 1:
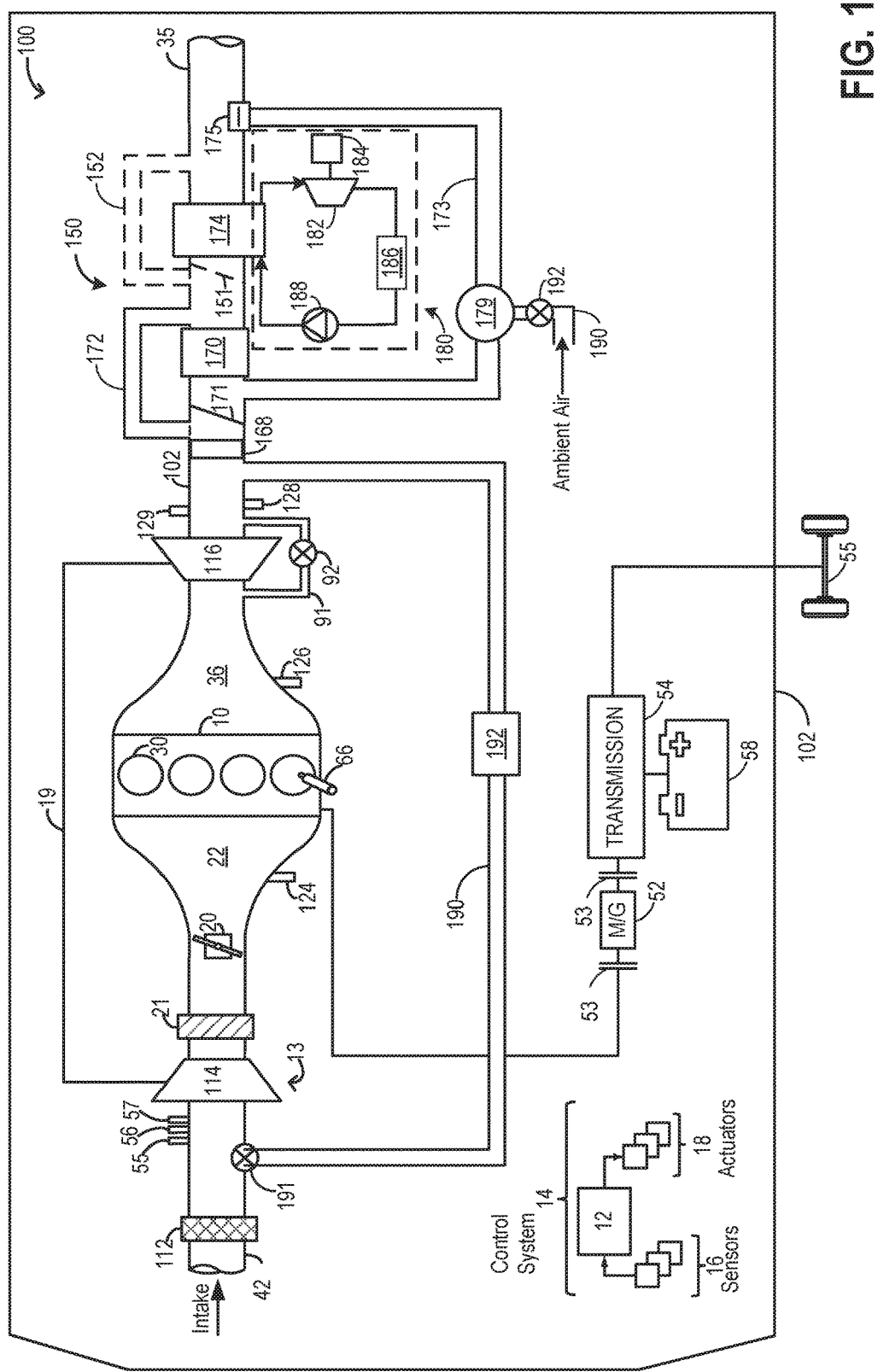
FIG. 1 shows an example embodiment of an engine system including an exhaust heat recovery system.

The following description relates to systems and methods for exhaust heat recovery. An example embodiment of an engine exhaust heat recovery system including a heat exchanger that is part of a bottoming cycle is shown at FIG. 1. Different modes of operation of the heat recovery system are shown at FIGS. 2A-2E and tabulated at FIG. 5. An engine controller may be configured to perform a control routine, such as the example routines of FIGS. 3 and 4, to vary the positions of one or more exhaust system valves to adjust exhaust flow through the components of the exhaust heat recovery system of FIG. 1 to maintain the thermal energy received at the exhaust heat exchanger within a target range. An example operation of the exhaust heat recovery system is shown in FIG. 6.

FIG. 1 schematically shows aspects of a motor vehicle 102 including an example engine system 100. In the depicted embodiment, an engine 10 of the engine system 100 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled, through charge-air cooler (CAC) 21 to throttle valve 20. Throttle valve 20 is coupled to engine intake manifold 22. From the compressor, the compressed air charge flows through the charge-air cooler 21 and the throttle valve to the intake manifold. In the embodiment shown in FIG. 1A, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 92 may be actuated open to dump at least some exhaust pressure from upstream of the turbine to a location downstream of the turbine via wastegate 91. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one example, each of the exhaust and intake valves may be electronically actuated or controlled. In another example, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections may be directed to turbine 116 to drive the turbine. The combined flow from the turbine and the wastegate 91 then flows through emission control device 168. Exhaust after-treatment device 168 may be configured to catalytically treat the exhaust flow, and thereby reduce an amount of one or more substances in the exhaust flow. For example, the exhaust after-treatment device 168 may be configured to trap $NO_x$ from the exhaust flow when the exhaust flow is lean, and to reduce the trapped $NO_x$ when the exhaust flow is rich. In other examples, the exhaust after-treatment device 168 may be configured to disproportionate $NO_x$ or to selectively reduce $NO_x$ with the aid of a reducing agent. In still other examples, the exhaust after-treatment device 168 may be configured to oxidize residual hydrocarbons and/or carbon monoxide in the exhaust flow. Different exhaust after-treatment catalysts having any such functionality may optionally be arranged in wash coats in the exhaust after-treatment stages, either separately or together. In some embodiments, the exhaust after-treatment stages may include a regeneratable soot filter configured to trap and oxidize soot particles in the exhaust flow. All or part of the treated exhaust from the exhaust after-treatment device 168 may be released into the atmosphere via main exhaust passage 102 after passing through a muffler.

An exhaust gas recirculation (EGR) delivery passage 190 may be coupled to the exhaust passage 102 upstream of the exhaust after-treatment device 168 (downstream of the turbine 116), to provide low pressure EGR (LP-EGR) to the engine intake manifold, upstream of compressor 114. An EGR cooler 192 may be coupled to the EGR passage 190 for cooling the exhaust before being delivered to the intake manifold. In further embodiments, the engine system may include a high pressure EGR flow path wherein exhaust is drawn from upstream of turbine 116 and recirculated to the engine intake manifold, downstream of compressor 114. One or more sensors may be coupled to EGR passage for providing details regarding the composition and condition of the EGR. An EGR valve 191 may be coupled to the EGR passage to regulate the flow of exhaust from the exhaust passage 102 to the intake passage 42.

An exhaust heat recovery system 150 may be coupled to the main exhaust passage downstream of the exhaust after-treatment device 168. The exhaust heat recovery system 150 may include a thermal storage device 170 housed in the exhaust passage 102. The thermal storage device may comprise a heat storage medium, such as a phase change material (PCM), a metal, a liquid, etc. Thermal storage device 170 may be used for opportunistically storing and withdrawing thermal energy from exhaust flow. During a charging phase of the thermal storage device 170, heat from exhaust flowing through the device may be temporarily stored in the heat storage medium. The thermal storage device 170 may also be operated in a discharging phase wherein heat from the device may be transferred to exhaust (or air) flowing through the device 170. In one example, storing thermal energy in the thermal storage device 170 includes transitioning the phase change material in the device from a solid phase to a liquid phase, while discharging thermal energy may include transitioning the phase change material from the liquid phase to the solid phase. A thermal storage device 170 bypass passage 172 may be coupled to the exhaust passage from upstream of the exhaust after-treatment device 168 to downstream of the thermal storage device 170. A first diverter valve 171 may be coupled to the main exhaust passage 102 to regulate exhaust flow through each of the thermal storage device 170 and the bypass passage 172.

The heat recovery system 150 may comprise a heat exchanger 174 coupled to the exhaust passage 102 downstream of the thermal storage device 170 and upstream of the tailpipe 35. Exhaust exiting the thermal storage device 170 and the bypass passage 172 may be routed to the tailpipe (to be released to the atmosphere) via the heat exchanger 174. In one embodiment, the heat recovery system 150 may further comprise a heat exchanger bypass passage 152 coupled to the exhaust passage from upstream of the heat exchanger 174 to downstream of the heat exchanger 174. A second diverter valve 151 may be coupled to the main exhaust passage 102 to regulate exhaust flow through each of the heat exchanger 174 and the heat exchanger bypass passage 152.

The heat exchanger may be part of a bottoming cycle 180. In one example, the bottoming cycle 180 may be an organic Rankine cycle. For optimal efficiency of the bottoming cycle, it may be desired to provide a steady flow of exhaust having an exhaust thermal energy within a target energy range through the heat exchanger 174. An upper limit of the target energy range (herein also referred to as a first threshold) and a lower limit of the energy range (herein also referred to as a second threshold) may each be based on one or more parameters of the bottoming cycle, such as a pressure drop across the expander, physical properties of the working fluid circulating through the bottoming cycle, and a temperature of the working fluid of the bottoming cycle. Thermal energy generated by the engine exhaust may be based on engine operating conditions and may be estimated as a function of exhaust temperature and exhaust flow-rate. The exhaust thermal energy may increase with an increase in each of exhaust temperature and exhaust flow-rate. Flow of exhaust have too much thermal energy (such as exhaust having thermal energy that is higher than the first threshold or upper limit of the bottoming cycle) as well as exhaust having too little thermal energy (such as exhaust having thermal energy that is lower than the second threshold or lower limit of the bottoming cycle) may result in a drop in efficiency of the bottoming cycle. Also, exhaust having higher than the first threshold thermal energy may cause thermal degradation of the bottoming cycle components. By maintaining a steady exhaust thermal input to the bottoming cycle, a higher efficiency may be maintained even by using smaller and lighter components of the bottoming cycle, thereby achieving cost and component reduction benefits. By maintaining a steady output of electrical energy from the bottoming cycle, the electrical energy from the battery may be more effectively managed and used.

The organic Rankine cycle may comprise an expander 182, such as a turbine, a condenser 186, and a pump 188. An organic working fluid such as R45fa, R123, toluene, etc. with a sufficiently low boiling point may be circulated through the components of the Rankine cycle. Heat from exhaust flowing through the heat exchanger may be transferred to the organic fluid circulating through the heat exchanger. The heated fluid may then flow through the turbine 182 and the thermal energy may be used to drive the turbine. Electrical energy may be generated from the thermal energy via the spinning turbine 182, and the electrical energy may be stored in a battery 184 coupled to the turbine 182. In order to effectively generate electricity, a target pressure ratio may be maintained at the turbine 182 by maintaining a steady flow (within the target range) of exhaust through the heat exchanger 174. The electrical energy from the battery may be opportunistically utilized for functions such as operating a motor of a compressor, operating a pump, cylinder head heating, vehicle cabin heating and lighting, etc. After flowing through the turbine, the cooled organic fluid may be routed to the condenser 186 wherein the fluid is further cooled by a cooling fluid. In one example, the cooling fluid includes engine coolant. The cooled working fluid may then be circulated back to the heat exchanger via a pump 188 where the fluid can take up exhaust heat and repeat the cycle. In this way, exhaust heat may be effectively recovered and converted to electrical energy. It will be appreciated that while the above example discloses an organic Rankine cycle, in alternate examples, other types of bottoming cycles may be used for exhaust heat recovery. These may include, for example, a steam Rankine cycle, a Brayton cycle, a Kalina cycle, and a Stirling cycle. Alternatively, thermoelectric materials may be used for electricity generation from the recovered exhaust thermal energy.

A recirculation passage 173 may be coupled to the main exhaust passage for recirculating exhaust from downstream of the heat exchanger 174 to upstream of the thermal storage device 170 (and downstream of diverter valve 171). A recirculation valve 175 may be coupled to the junction of the passage 173 and the main exhaust passage 102, downstream of the heat exchanger 174, to regulate exhaust flow from the main exhaust passage 102 into the recirculation passage 173. By adjusting the position of recirculation valve 175, a portion of exhaust may be recirculated back to the main exhaust passage, after exhaust heat recovery at the heat exchanger, to a location upstream of the thermal storage device 170 via the recirculation passage 173. A blower 179 may be coupled to the recirculation passage 173 to facilitate the exhaust flow recirculation. A vent line 190 with a vent valve 192 may be coupled to the recirculation passage via the blower 179. During conditions when exhaust thermal energy is low due to low exhaust flow rates, blower 179 may be operated to draw in ambient air into the recirculation passage through the vent line 190. An air-exhaust mixture having an elevated flow rate can then be routed to the main exhaust passage, upstream of the thermal storage device 170, via the recirculation passage 173. The exhaust heat recovery system 150 may be operated in one of a plurality of modes, a mode selection based on the thermal energy level of the engine exhaust relative to a target energy range. By selecting a mode based on the thermal energy level, the exhaust thermal energy level may be maintained within the target energy range at a time of exhaust flow through the heat exchanger. As a result, heat transfer to the bottoming cycle is increased.

For example, the exhaust heat recovery system 150 may be operated in a first mode with the diverter valve 171 fully open to route the entire volume of exhaust exiting the exhaust after-treatment device 168 to the heat exchanger 174 via the bypass 172. In this mode, the exhaust reaches the heat exchanger while bypassing the thermal storage device 170. Since exhaust does not flow through the thermal storage device 170, exhaust heat is neither stored nor withdrawn from the thermal storage device 170. In the first mode, recirculation valve 175 is in the closed position to disable recirculation of exhaust to the thermal storage device via recirculation passage 173. The exhaust heat recovery system 150 may be operated in the first mode during engine operating conditions, such as mid-load conditions, when the exhaust thermal energy is within the target range. Also, during engine cold-start conditions, the heat recovery system may be operated in the first mode, and the entire volume of exhaust may be directly routed through the heat exchanger for expedited exhaust heat recovery to be used for meeting engine heating and vehicle cabin demands. An example depiction of exhaust heat recovery system operation in the first mode is elaborated with reference to FIG. 2A.

The exhaust heat recovery system 150 may be operated in a second mode with the diverter valve 171 partially open to route a first portion of exhaust to the heat exchanger 174 via the bypass 172 while routing a second (remaining) portion of exhaust to the heat exchanger 174 via the thermal storage device 170. In this mode, the recirculation valve 175 may be maintained in the closed position. The exhaust heat recovery system 150 may be operated in the second mode during engine operating conditions, such as high-load conditions, when the exhaust thermal energy exceeds the upper limit of the target energy range (that is, when there is excessive exhaust thermal energy), and a difference between the estimated exhaust thermal energy and the upper limit of the target energy range is lower than a threshold difference. The excess thermal energy (that is in excess of the upper limit of the target range) from the second portion of exhaust (and not from the first portion) may be stored at the thermal storage device 170 as the second portion of exhaust flows through the thermal storage device 170. An example depiction of exhaust heat recovery system operation in the second mode is elaborated with reference to FIG. 2B.

The exhaust heat recovery system 150 may be operated in a third mode with the diverter valve 171 fully closed to route the entire volume of exhaust to the heat exchanger 174 via the thermal storage device 170. Also, in this mode, the recirculation valve 175 may be maintained in the closed position. The exhaust heat recovery system 150 may be operated in the third mode during engine operating conditions, such as peak-load conditions, when the exhaust thermal energy exceeds the upper limit of the target energy range (that is, when there is excessive exhaust thermal energy), and the difference between the estimated exhaust thermal energy and the upper limit of the target energy range is higher than the threshold difference. In this mode, the excess energy from the exhaust may be stored at the thermal storage device 170 as the entire volume exhaust flows through the thermal storage device 170. During operation in this mode, as the state of charge of the thermal storage device 170 increase to its upper limit, thermal energy may no longer be stored in the device 170. However, as the exhaust thermal energy exceeds the upper limit of the target energy range, if entire volume of exhaust is routed via the heat exchanger there may be degradation of the bottoming cycle components. During such conditions, the valve 151 may be partially opened to route a first portion of exhaust exiting the thermal storage device 170 through the bypass passage (bypassing the heat exchanger 174) while a second (remaining) portion of exhaust flows through the heat exchanger 174. An example depiction of exhaust heat recovery system operation in the third mode is elaborated with reference to FIG. 2C.

The exhaust heat recovery system 150 may be operated in a fourth mode with the diverter valve 171 fully closed to route the entire volume of exhaust to the heat exchanger 174 via the thermal storage device 170. In the fourth mode, the recirculation valve 175 may be opened to divert at least a portion of the cooled exhaust exiting the heat exchanger 174 to the main exhaust passage 102 upstream of the thermal storage device 170. The recirculated exhaust may then mix with the exhaust generated by the engine and flow through the thermal storage device 170. The exhaust heat recovery system 150 may be operated in the fourth mode during engine operating conditions, such as low-load conditions, when the exhaust thermal energy is lower than the lower limit of the target energy range. In order to maintain a steady exhaust flow (with exhaust thermal energy within the target range), heat previously stored in the thermal storage device 170 may be withdrawn when the recirculated exhaust flows through the heat storage device, before being routed (together with fresh exhaust) through the heat exchanger. An example depiction of exhaust heat recovery system operation in the fourth mode is elaborated with reference to FIG. 2D.

The exhaust heat recovery system 150 may be operated in a fifth mode with the diverter valve 171 fully closed to route the entire volume of exhaust to the heat exchanger 174 via the thermal storage device 170. In this mode, the recirculation valve 175 may be opened to divert at least a portion of the cooled exhaust exiting the heat exchanger 174 to the main exhaust passage 102 upstream of the thermal storage device 170. Also, ambient air may be drawn into the recirculation passage via the vent line 190 by operating the blower 179. The air-exhaust mixture is then recirculated to the main exhaust passage 102, upstream of the thermal storage device 170. The air-exhaust mixture may further mix with exhaust generated by the engine and flow through the thermal storage device 170. The exhaust heat recovery system 150 may be operated in the fifth mode during engine operating conditions such as idle or engine off conditions for a hybrid electric vehicle when the exhaust thermal energy is lower than the lower limit of the target energy range and the exhaust flow-rate is lower than a threshold flow-rate. In order to maintain a steady exhaust flow (with exhaust thermal energy within the target range), heat previously stored in the thermal storage device 170 may be used to heat the ambient and the recirculated exhaust which is then routed (together with fresh exhaust) through the heat exchanger. An example depiction of exhaust heat recovery system operation in the fifth mode is elaborated with reference to FIG. 2E.

In this way, during a first condition, a portion of exhaust may be recirculated from downstream of the heat exchanger 174 to upstream of the thermal storage device 170, the recirculated exhaust may be mixed with exhaust generated by the engine to form a combined exhaust flow, the combined exhaust flow may be heated by drawing thermal energy from the thermal storage device, and then the combined exhaust flow may be routed through the heat exchanger. During a second condition, ambient air may be drawn in via a blower 178 coupled to a vent line 190, the ambient air may be routed to upstream of the thermal storage device 170, the ambient air may be mixed with exhaust generated by the engine to form the combined exhaust flow, the combined exhaust flow may be heated by drawing thermal energy from the thermal storage device 170, and then the combined exhaust flow may be routed through the heat exchanger 174. The first condition includes a lower than lower limit thermal energy due to a lower than threshold exhaust temperature and a higher than threshold exhaust flow-rate, and the second condition includes a lower than lower limit thermal energy due to a higher than threshold exhaust temperature and a lower than threshold exhaust flow-rate. The second condition may also include a lower than lower limit thermal energy due to a lower than threshold exhaust temperature and a lower than threshold exhaust flow-rate. Detailed description of the operating modes of the exhaust heat recovery system 150 is discussed in relation to FIGS. 2A-2E.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas oxygen sensor 126 located upstream of the turbine 116, MAP sensor 124, exhaust temperature sensor 128, exhaust pressure sensor 129, and engine coolant temperature sensor. Other sensors such as additional pressure, temperature, air/fuel ratio, flow rate, and composition sensors may be coupled to various locations in engine system 100. The actuators 81 may include, for example, throttle 20, diverter valve 171, recirculation valve 175, blower 179, pump 188, wastegate 92, vent valve 192, and fuel injector 66. The control system 14 may include a controller 12. The controller 12 may receive input data from the various sensors, process the input data, and trigger various actuators in response to the processed input data based on instruction or code programmed therein corresponding to one or more routines. In one example, based on sensed exhaust temperature and exhaust flow-rate, the controller 12 may compute an exhaust thermal energy, and upon comparing the computed thermal energy to a target range, the controller may send a signal to the diverter valve 171 and the recirculation valve 175 to adjust the opening of each of the diverter valve and the recirculation valve in order to select an exhaust flow-path through the thermal storage device 170, the bypass passage 172, the heat exchanger 174, and the recirculation passage 173. In another example, based at least on the sensed exhaust flow-rate, the controller may send a power output signal to an actuator coupled to the blower 179 and open the vent valve 192 to admit a desired amount of ambient air into the exhaust heat recovery system 150.

In some examples, vehicle 102 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 102 includes engine 10 and an electric machine 52. Electric machine 52 may be a motor or a motor/generator. Engine 10 and electric machine 52 are connected via a transmission 54 to vehicle wheels 55 when one or more clutches 56 are engaged. In the depicted example, a first clutch 56 is provided between enjoin 10 and electric machine 52, and a second clutch 56 is provided between electric machine 52 and transmission 54. Controller 12 may send a signal to an actuator of each clutch 56 to engage or disengage the clutch, so as to connect or disconnect engine 10 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Figure 2A:
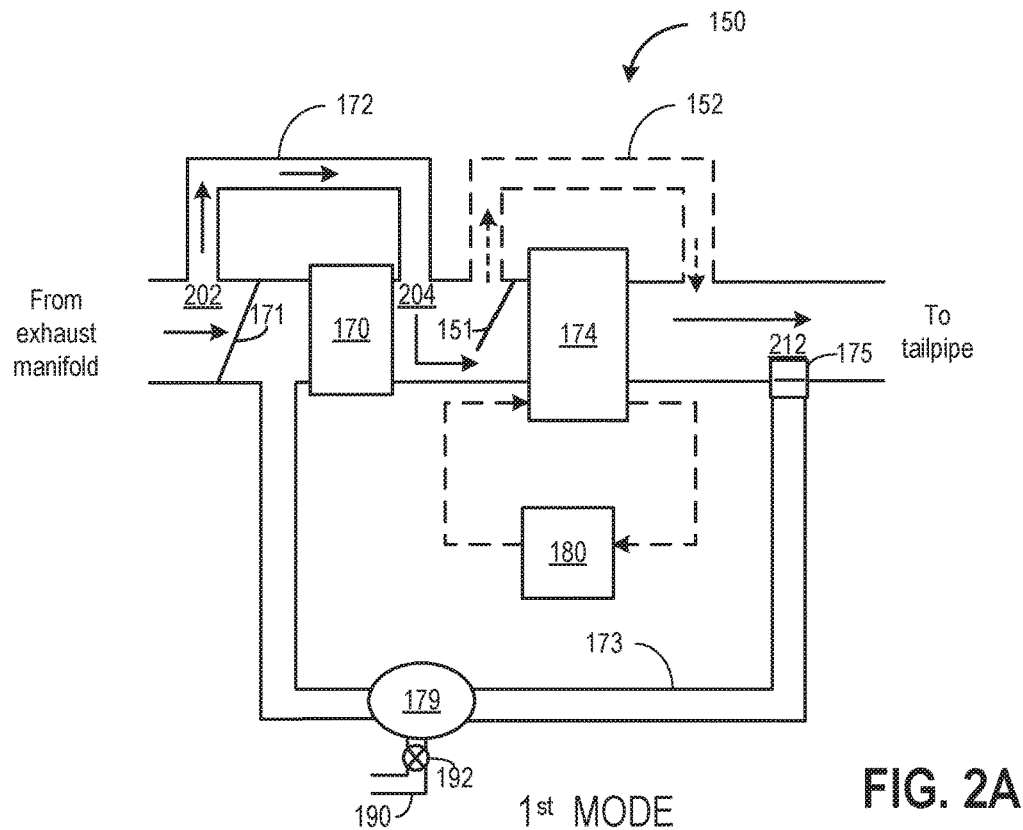
FIG. 2A shows the exhaust heat recovery system of FIG. 1 operating in a first mode.

FIG. 2A shows an example embodiment 200 of operating the exhaust heat recovery system 150 of FIG. 1 in a first operating mode. In one example, the exhaust heat recovery system 150 is the exhaust heat recovery system 150 of FIG. 1 and therefore may share common features and/or configurations as those already described in FIG. 1. Components previously described in FIG. 1 are numbered similarly and not reintroduced.

As shown in FIG. 2A, a thermal storage device 170 may be coupled to the exhaust passage 102. The thermal storage device may be sized to be small enough to reduce the cost of the exhaust heat recovery system. The thermal storage device may comprise a heat storage medium such as a phase change material (PCM), a metal, a liquid etc. As an example, the PCM used may utilize solid-to-solid, solid-to-liquid, or liquid-to-vapor phase changing to accept heat from exhaust flowing through the thermal storage device 170. During the charging phase of the thermal storage device 170, heat from exhaust may be temporarily stored in the heat storage medium, however, the thermal storage device (PCM) may have a finite capacity for energy storage and once the capacity has been fulfilled, further heat transfer to the PCM may no longer take place. Also, due to the smaller size of the thermal storage device, thermal energy may not be stored for a prolonged duration of time. The thermal storage device 170 may also be operated in a discharging mode wherein heat from the device may be transferred to exhaust (or air) flowing through the device 170. A bypass passage 172 may originate from the exhaust passage 102 at the junction 202, upstream of the thermal storage device 170, and may end in the exhaust passage at junction 204, downstream of the device 170. A diverter valve 171 may be coupled to the exhaust passage 102 downstream of the junction 202 to regulate exhaust flow via the bypass passage 172. The opening of the diverter valve 171 may be adjusted to route at least a portion of exhaust through the bypass passage, bypassing the thermal storage device 170, while a remaining portion of the exhaust is routed to the heat exchanger through thermal storage device 170. In one embodiment, a heat exchanger bypass passage 152 may be coupled to the exhaust passage from upstream of the heat exchanger 174 to downstream of the heat exchanger 174. The opening of a diverter valve 151 may be coupled to the main exhaust passage 102 may be adjusted to route a portion of exhaust via the bypass passage 152 thereby bypassing the heat exchanger 174.

In the first mode, the diverter valve 171 is actuated to a fully open position while the recirculation valve 175 may be actuated to its fully closed position. Also, the vent valve 192 in the vent line 190 is maintained in the closed position to disable ambient air-flow into the vent line 190. Due to the open position of the diverter valve 171, exhaust exiting the exhaust after-treatment device may not flow through the thermal storage device 170 but may enter the bypass passage 172 (at junction 202) instead. The entire volume of exhaust (as shown by solid lines) may bypass the thermal storage device 170 (by flowing through the bypass passage 172) and enter the heat exchanger 174. As the exhaust bypasses the thermal storage device 170 in this mode, thermal energy is not stored at the device 170 and the entire thermal energy may be routed to the heat exchanger 174. Thermal energy from the exhaust may be transferred to an organic working fluid circulating through the heat exchanger. The recovered thermal energy may then be converted to electrical energy via the bottoming cycle 180 and stored in a battery for future use. As the recirculation valve 175 is in a closed position, exhaust exiting the heat exchanger may not enter the recirculation passage and may be released to the atmosphere via the tailpipe.

The exhaust heat recovery system 150 may be operated in the first mode during selected engine operating conditions including an engine cold-start when exhaust heat recovery is desired for engine heating and vehicle cabin heating. Also, the system 150 may be operated in the first mode during engine mid-load conditions when the thermal energy of exhaust flowing through the heat exchanger 174 is within the target energy range.

As an example, the system 150 may be operated in the first mode when the thermal storage device 170 is saturated with energy (that is, at full capacity) and cannot accept any further thermal energy without first discharging at least some of the energy. During conditions when the thermal storage device is at capacity, any excess exhaust thermal energy (that is outside the target energy range) may be routed through the heat exchanger 174. However, if the exhaust thermal energy is higher than the target range, the diverter valve 151 may be at least partially opened to flow a first portion of exhaust via the heat exchanger bypass passage 152 while the remaining (second) portion of exhaust may flow through the heat exchanger 174. Thermal energy may be recovered by the bottoming cycle from the second portion of exhaust flowing through the heat exchanger. The ratio of the first portion to the second portion may be adjusted based on the difference between the actual exhaust thermal energy and the upper limit of the target range. As such, the opening of the diverter valve 151 may be increased to increase the first portion of exhaust as the difference between the actual exhaust thermal energy and the upper limit of the target range increases while the opening of the diverter valve 151 may be decreased to decrease the first portion of exhaust as the difference between the actual exhaust thermal energy and the upper limit of the target range decreases.

Figure 2B:
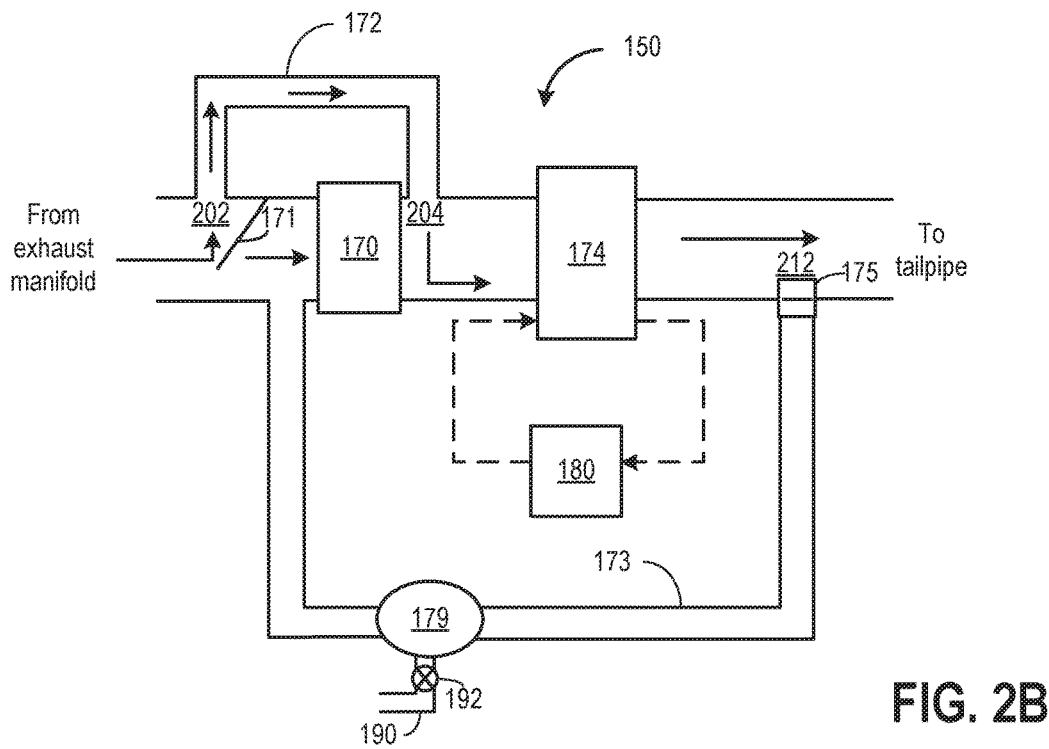
FIG. 2B shows the exhaust heat recovery system of FIG. 1 operating in a second mode.

FIG. 2B shows operation of the exhaust heat recovery system 150 in a second mode. In the second mode, the diverter valve 171 is actuated to a partially open position and the recirculation valve 175 is maintained in a closed position. Also, the vent valve 192 in the vent line 190 may be maintained in the closed position to disable ambient air-flow into the vent line 190. Due to the partially open position of the diverter valve 171, a first portion of exhaust exiting the exhaust after-treatment device may flow to the heat exchanger 174 via the bypass passage 172, without flowing through the thermal storage device. A second (remaining) portion of exhaust may flow to the heat exchanger 174 via the thermal storage device 170. The ratio of the first portion to the second portion may be selected based on a difference between the exhaust thermal energy and the upper threshold of the target energy range. In one example, the first portion may be increased relative to the second portion as the difference between the exhaust thermal energy and the upper threshold decreases. In another example, the first portion may be decreased relative to the second portion as the difference between the exhaust thermal energy and the upper threshold increases. In this way, the excess exhaust energy, above the target energy range (desired for optimal performance of the bottoming cycle 180), may be routed via the thermal storage device 170. Also, the ratio of the first portion to second portion may be adjusted based on a current state of charge (thermal energy status) of the thermal storage device 170. Therein, the second portion may be increased relative to the first portion as the state of charge of the thermal storage device 170 increases. The degree of opening of the diverter valve 171 may be adjusted to provide the selected ratio of the first portion relative to the second portion, the opening of the diverter valve increased to decrease the first portion and correspondingly increase the second portion. As the second portion of exhaust flows through the thermal storage device 170, the device 170 may be charged and at least a part of the exhaust thermal energy from the second portion may be stored for future use.

The first and second portions of exhaust may combine upstream of the heat exchanger 174 and then enter the heat exchanger 174. Thermal energy from both portions of exhaust may be transferred to an organic working fluid circulating through the heat exchanger. The recovered thermal energy may then be converted to electrical energy via the bottoming cycle 180 and stored in a battery for future use in operating vehicle components. As the recirculation valve 175 is in a closed position at this time, exhaust leaving the heat exchanger may not enter the recirculation passage, and may be released to the atmosphere via the tailpipe.

The exhaust heat recovery system 150 may be operated in the second mode during high-load engine operating conditions when the exhaust thermal energy is higher than the upper limit of the target energy range. The system 150 may be operated in the second mode provided the state of charge of the thermal storage 170 is below a threshold state of charge (that is, the device is not saturated with energy) and can store energy from exhaust flowing through it. By opportunistically storing excess thermal energy from a portion of the exhaust flow, the stored energy can be opportunistically used at a later time for heating exhaust and/or ambient air in order to maintain a steady supply of thermal energy at the heat exchanger 174.

FIG. 2C shows operation of the exhaust heat recovery system 150 in a third mode. In the third mode, the diverter valve 171 may be actuated to a fully closed position and the recirculation valve 175 may be maintained in the closed position. Also, the vent valve 192 in the vent line 190 may be maintained in the closed position to disable ambient air-flow into the vent line 190. Due to the fully closed position of the diverter valve 171, the entire volume of exhaust exiting the exhaust after-treatment device may flow to the heat exchanger 174 via the thermal storage device 170. As the exhaust flows through the thermal storage device 170, the device 170 may be charged and at least a part of the exhaust thermal energy may be stored. In this way, the excess exhaust energy, above the target energy range (desired for optimal performance of the bottoming cycle 180) may be stored in the thermal storage device 170 for future use. The exhaust exiting the thermal storage device 170 may then enter the heat exchanger 174. The remaining exhaust thermal energy (after flowing through the thermal storage device 170) may be in the target energy range and may be transferred to the organic working fluid circulating through the heat exchanger. The recovered thermal energy may then be converted to electrical energy via the bottoming cycle 180 and stored in a battery for future use in operating vehicle components. As the recirculation valve 175 is in a closed position, exhaust exiting the heat exchanger may not enter the recirculation passage and may be released to the atmosphere via the tailpipe.

The exhaust heat recovery system 150 may be operated in the third mode during peak-load engine operating conditions when the exhaust thermal energy is higher than the upper limit of the target energy range. In order to operate the system in the third mode, a higher than threshold difference between the upper limit of the target energy range and the exhaust thermal energy may need to be confirmed. Due to the higher exhaust thermal energy, a larger portion of the energy may be stored in the thermal storage device. The system 150 may be operated in the third mode until the state of charge of the thermal storage 170 reaches the threshold state of charge when the device is saturated with energy and no longer able to store any further energy from exhaust flow. It will be appreciated that the second mode (as described in FIG. 2B) may encompass the third mode wherein the opening of the diverter valve 171 is decreased until it reaches a closed position (as seen in the third mode) to flow exhaust through the thermal storage device 170 before reaching the heat exchanger 174, and no exhaust flow is diverted through the bypass passage 173.

During operation in the third mode, as the state of charge of the thermal storage device 170 increase to its threshold state of charge when the device is saturated with energy, thermal energy from exhaust may no longer be stored in the device 170 (until at least a portion of the energy has been discharged). However, as the exhaust thermal energy exceeds the upper limit of the target energy range if entire volume of exhaust is routed via the heat exchanger there may be degradation of the bottoming cycle components. During such conditions, the valve 151 may be partially opened to route a first portion of exhaust exiting the thermal storage device 170 through the bypass passage (bypassing the heat exchanger 174) while a second (remaining) portion of exhaust flows through the heat exchanger 174. The ratio of the first portion to the second portion may be adjusted based on the difference between the actual exhaust thermal energy and the upper limit of the target range. As such, the opening of the diverter valve 151 may be increased to increase the first portion of exhaust as the difference between the actual exhaust thermal energy and the upper limit of the target range increases while the opening of the diverter valve 151 may be decreased to decrease the first portion of exhaust as the difference between the actual exhaust thermal energy and the upper limit of the target range decreases. Further, once the threshold state of charge (of thermal storage device) is reached, the diverter valve 171 may be fully opened such that exhaust may bypass the thermal storage device 170 before entering the heat exchanger bypass passage 152 and the heat exchanger 174.

FIG. 2D shows operation of the exhaust heat recovery system 150 in a fourth mode. In the fourth mode, the diverter valve 171 is actuated to a fully closed position while the recirculation valve 175 is actuated to an open position. The vent valve 192 in the vent line 190 may be maintained in the closed position to disable ambient air-flow into the vent line 190. Due to the fully closed position of the diverter valve 171, the entire volume of exhaust exiting the exhaust after-treatment device may flow to the heat exchanger 174 via the thermal storage device 170. The exhaust exiting the thermal storage device 170 may then flow through the heat exchanger 174. Due to the opening of the recirculation valve 175, at least a portion of the cooled exhaust exiting the heat exchanger 174 may enter the recirculation passage 173 and may be routed to the exhaust passage 102 (at junction 210) via the blower. The blower may facilitate routing the exhaust from downstream of the heat exchanger 174 to upstream of the thermal storage device 170. The cooled exhaust may then combine with the exhaust generated by the engine and the combined exhaust stream may enter the thermal storage device 170.

In the fourth mode, the thermal storage device 170 may operate in the discharge mode and thermal energy previously stored (from exhaust) during operation of the heat recovery system 150 in the second and third mode may be transferred to the exhaust flowing through the thermal storage device 170. The exhaust may be heated to an extent such that the thermal energy of exhaust entering the heat exchanger is within the target range. The extent of heating may be based on the thermal energy (determined as a function of exhaust temperature and flow-rate) of exhaust generated by the engine. Also, the opening of the recirculation valve 175 may be based on the thermal energy of the exhaust generated by the engine. If the thermal energy of the exhaust generated by the engine is lower, a higher volume of exhaust may be recirculated via the valve 175 to be heated at the thermal storage device 170. In one example, the opening of the valve 175 may be increased with a decrease in the thermal energy of the exhaust generated by the engine.

As the heated exhaust flows through the heat exchanger 174, thermal energy from the exhaust may be recovered via the working fluid and the recovered thermal energy may then be converted to electrical energy via the bottoming cycle 180 and stored in a battery for future use in operating vehicle components. In this way, even during engine operating conditions when the thermal energy of the exhaust is below the lower threshold of the target range, the efficiency of the bottoming cycle 180 may be maintained by ensuring a steady supply of exhaust to the heat exchanger 174.

The exhaust heat recovery system 150 may be operated in the fourth mode during low-load engine operating conditions when the exhaust thermal energy is lower than the lower limit of the target energy range. In order to operate the exhaust heat recovery system 150 in the fourth mode, it may be confirmed that the exhaust flow-rate is higher than a threshold flow-rate such that at least a portion of exhaust may be recirculated and heated at the thermal storage device 170. The energy spent in operating the blower 179 for recirculating the exhaust may be lower than the additional electrical energy generated at the bottoming cycle 180 (from the recirculating exhaust flow), thereby making the exhaust heat recovery process overall energy efficient.

Figure 2E:
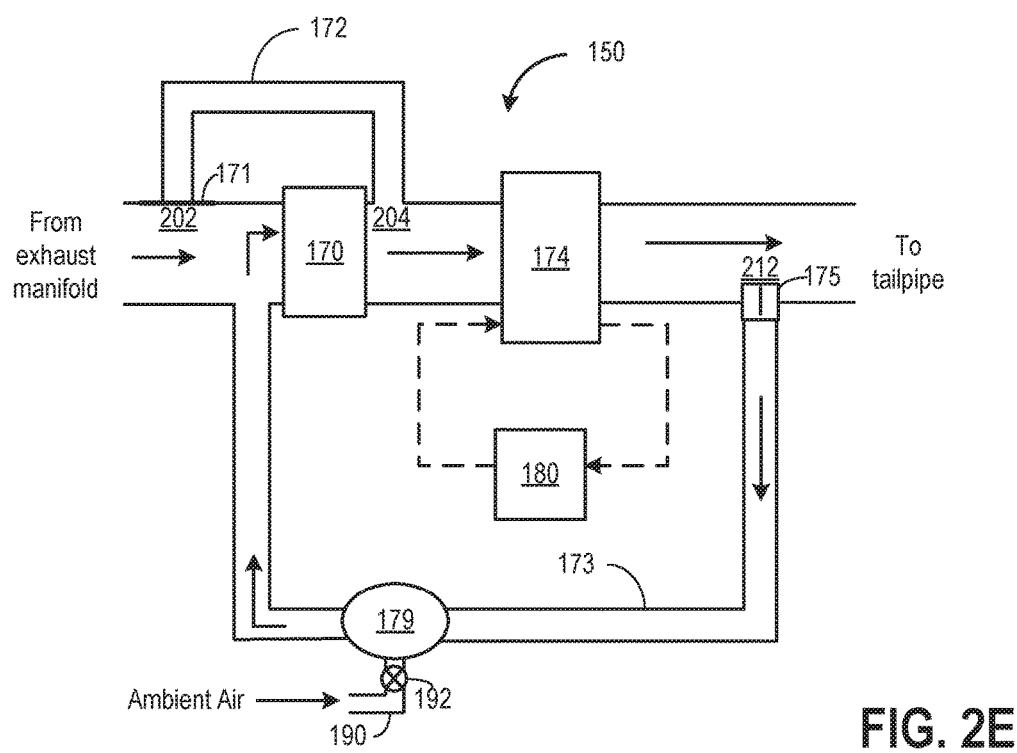
FIG. 2E shows the exhaust heat recovery system of FIG. 1 operating in a fifth mode.

FIG. 2E shows operation of the exhaust heat recovery system 150 in a fifth mode. In the fifth mode, the diverter valve 171 is actuated to a fully closed position while the recirculation valve 175 is actuated to an open position. The vent valve 192 in the vent line 190 may be actuated to an open position to enable ambient air-flow into the vent line 190. Due to the fully closed position of the diverter valve 171, the entire volume of exhaust exiting the exhaust aftertreatment device 168 may flow to the heat exchanger 174 via the thermal storage device 170. The exhaust exiting the thermal storage device 170 may then flow through the heat exchanger 174. Due to the opening of the vent valve 192, ambient air may be drawn into the vent line 190 by the blower 179. The ambient air may then be routed to the exhaust passage 102 (at junction 210), upstream of the thermal storage device 170. The air may then combine with the exhaust generated by the engine and the combined gaseous mixture may enter the thermal storage device 170.

In the fifth mode, the thermal storage device 170 may operate in a discharging mode and thermal energy previously stored (from prior exhaust flow during operation of the heat recovery system 150 in the second or third mode) may be transferred to the combined air and exhaust stream flowing through the thermal storage device 170. The air and exhaust stream may be heated to an extent such that the thermal energy of the gaseous mixture entering the heat exchanger may be within the target range. The extent of heating may be based on the thermal energy (temperature and flow-rate) of exhaust. The opening of the vent valve 192 may be based on the measured exhaust flow-rate. In one example, in response to a decrease in exhaust flow-rate, the volume of ambient air drawn in may be increased and the opening of the vent valve 192 may be correspondingly increased to raise the exhaust flow rate (and thereby the exhaust thermal energy). In another example, in response to an increase in exhaust flow-rate, the volume of ambient air drawn in may be decreased and the opening of the vent valve 192 may be correspondingly decreased to lower the exhaust flow rate (and thereby the exhaust thermal energy).

As the heated mixture (exhaust and air) flows through the heat exchanger 174, thermal energy from the mixture may be recovered via the working fluid and the recovered thermal energy may then be converted to electrical energy via the bottoming cycle 180 and stored in a battery for future use in operating vehicle components. In this way, even during engine operating conditions when each of the exhaust flow-rate is lower than a threshold flow-rate and exhaust thermal energy is below the lower threshold of the target range, the efficiency of the bottoming cycle 180 may be maintained by ensuring a steady supply of the mixture with an optimal thermal energy content.

The exhaust heat recovery system 150 may be operated in the fifth mode during engine idling conditions when exhaust flow-rate is below a threshold flow rate and the exhaust thermal energy is lower than the lower limit of the target energy range. Also, for hybrid vehicles, during engine-off conditions, when there is no exhaust flow, the system 150 may be operated in the fifth mode to that ambient air may be drawn in to maintain a steady flow through the heat exchanger. The energy spent to operate the blower 179 for drawing in ambient air may be lower than the additional electrical energy generated at the bottoming cycle 180 (from the recirculated gaseous mixture flow), therefore making the exhaust heat recovery process energy efficient.

In this way, the system of FIGS. 1 and 2A-2E provide for an engine system coupled to a vehicle comprising: an engine intake manifold, an engine exhaust system including an exhaust temperature sensor and an exhaust pressure sensor coupled to a main exhaust passage, a bypass passage coupled to the maintain exhaust passage, across a thermal storage device, and a recirculation passage including a blower for recirculating exhaust from downstream of a heat exchanger to upstream of the thermal storage device, an exhaust heat recovery system including the thermal storage device coupled to the exhaust passage, the heat exchanger coupled downstream of the thermal storage device, a bottoming cycle including the heat exchanger, an expander coupled to a battery, a condenser, and a pump for circulating a working fluid through the bottoming cycle, a vent line including a vent valve coupled to the recirculation passage, a diverter valve coupled to the exhaust passage for regulating exhaust flow via the bypass passage, a recirculation valve coupled to the recirculation passage for regulating recirculation of exhaust downstream of the heat exchanger to upstream of the thermal storage device. The system may further include a controller with computer readable instructions stored on non-transitory memory for: operating the exhaust heat recovery system in a first mode with the diverter valve closed, the recirculation valve closed, and the vent valve closed to flow exhaust directly to the heat exchanger, bypassing the thermal storage device, and operating the exhaust heat recovery system in a second mode with the diverter valve open, the recirculation valve closed, and the vent valve closed to flow a first portion of exhaust directly to the heat exchanger bypassing the thermal storage device and a second portion of exhaust to the heat exchanger via the thermal storage device while transferring thermal energy from the second part of exhaust to the thermal storage device, and transitioning from the first to the second mode responsive to an increase in an estimated exhaust thermal energy above a first threshold thermal energy, the thermal energy of the exhaust estimated based on inputs from the exhaust temperature and pressure sensors.

Figure 5:
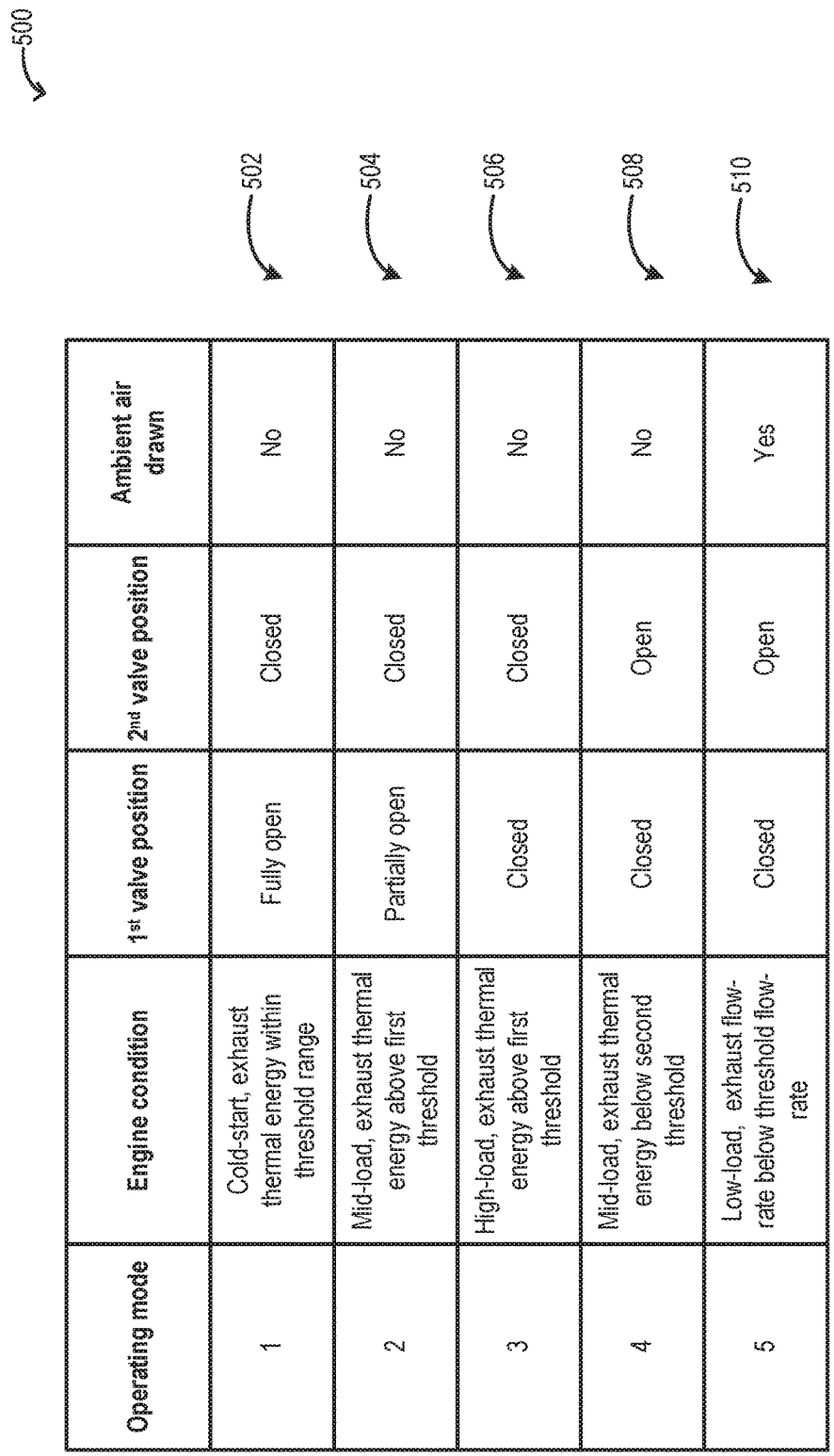
FIG. 5 shows a table illustrating the different modes of operation of the exhaust heat recovery system of FIG. 1.
Figure 6:
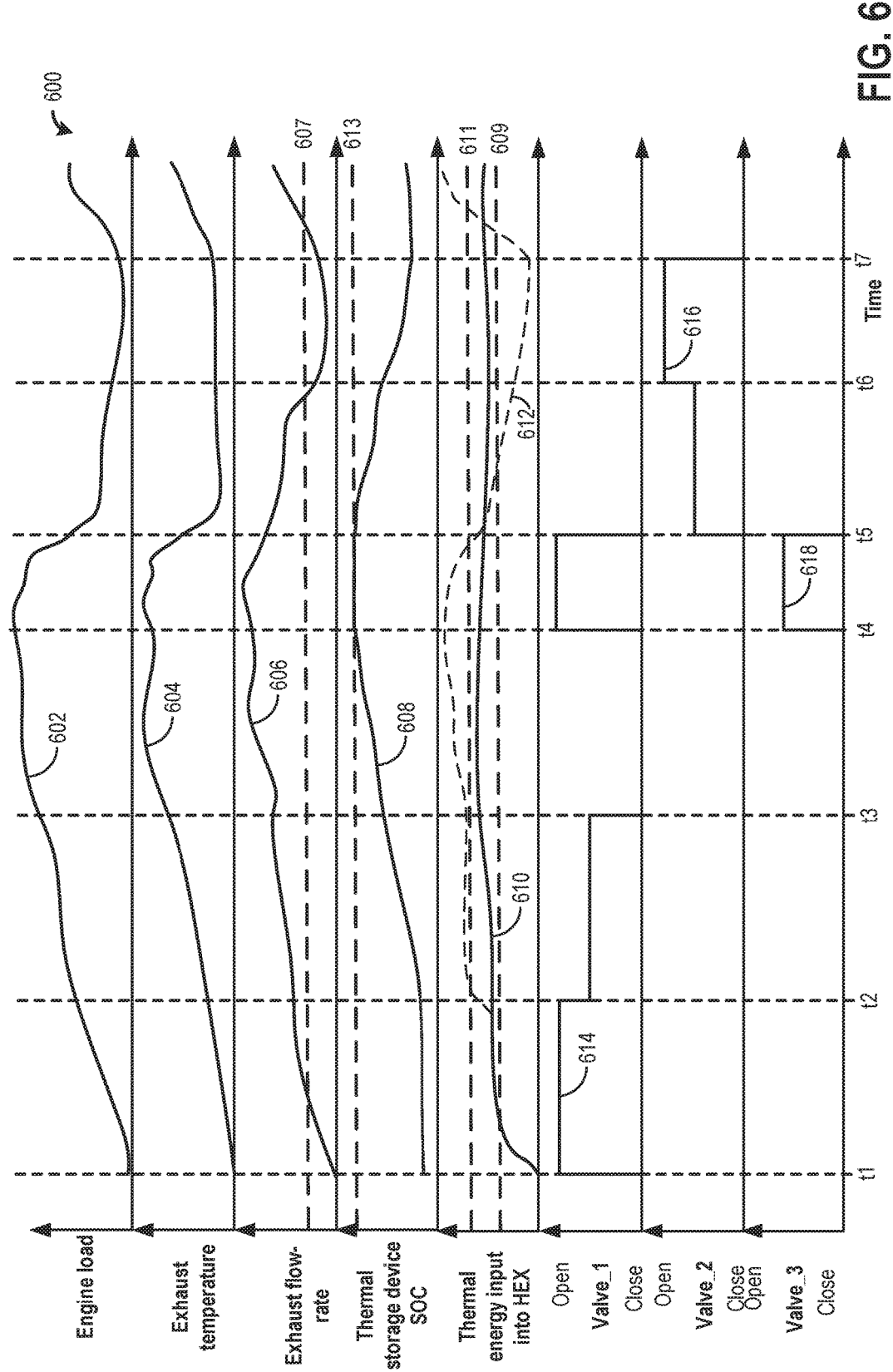
FIG. 6 shows an example operation of the exhaust heat recovery system, according to the present disclosure.

The five example modes of operation of the exhaust heat recovery system as shown in FIGS. 2A-2E are tabulated in FIG. 5. Line 502 of table 500 shows settings corresponding to the operation of the exhaust heat recovery system in the first mode as described in FIG. 2A, line 504 shows settings corresponding to the operation of the exhaust heat recovery system in the second mode as described in FIG. 2B, line 506 shows settings corresponding to the operation of the exhaust heat recovery system in the third mode as described in FIG. 2C, line 508 shows settings corresponding to the operation of the exhaust heat recovery system in the fourth mode as described in FIG. 2D, and line 510 shows settings corresponding to the operation of the exhaust heat recovery system in the fifth mode as described in FIG. 2E. The exhaust heat recovery system may be operated in a plurality of additional operating modes based on engine operating conditions and bottoming cycle conditions.

Figure 3:
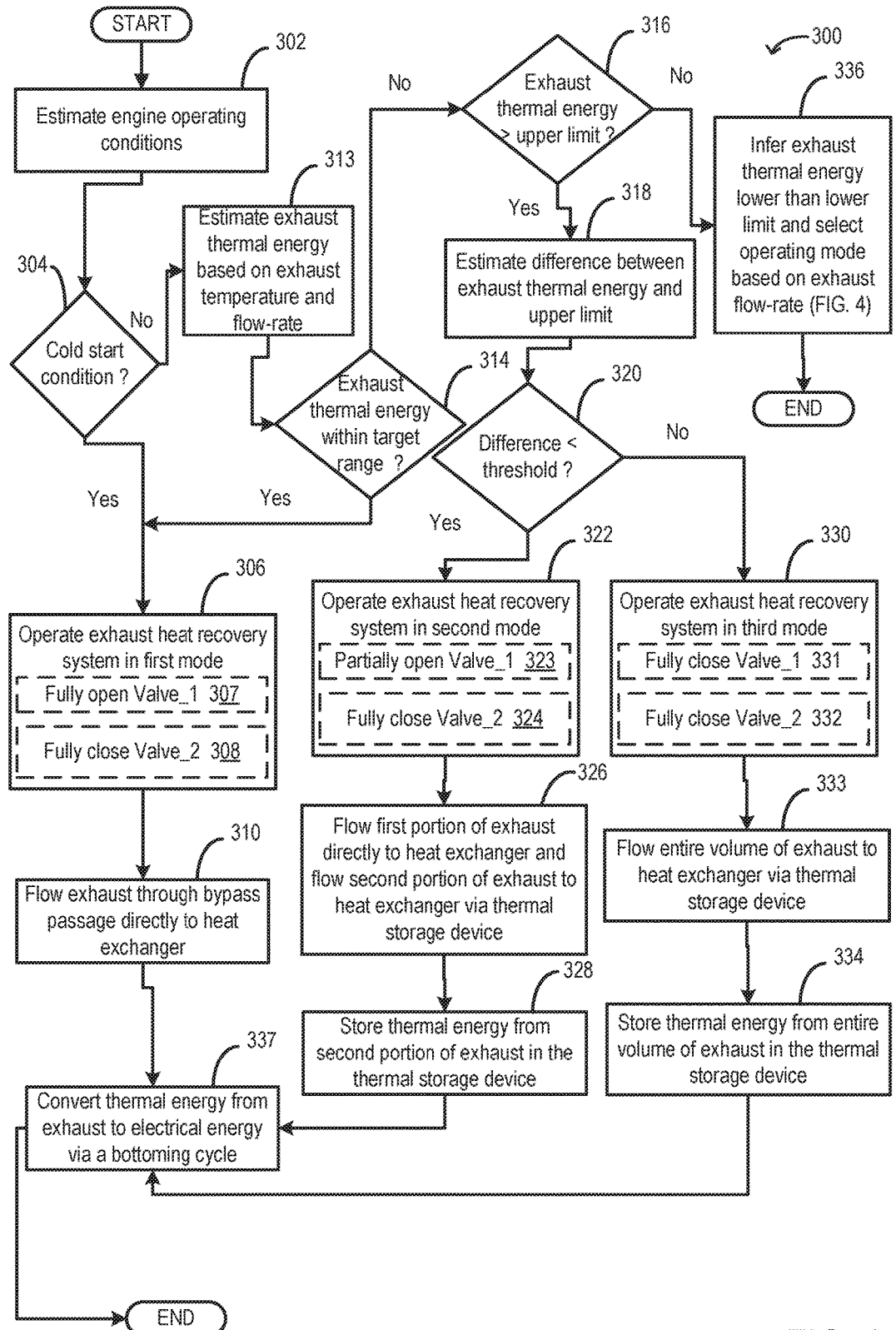
FIG. 3 shows a flow chart illustrating an example method that may be implemented for adjusting exhaust flow through the exhaust heat recovery system of FIG. 1 when there is excess exhaust thermal energy available.

FIG. 3 illustrates an example method 300 that may be implemented for adjusting exhaust flow through the exhaust heat recovery system of FIG. 1. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the routine includes estimating and/or measuring engine operating conditions. Conditions assessed may include, for example, driver demand, engine temperature, engine load, engine speed, exhaust temperature, ambient conditions including ambient temperature, pressure, and humidity, manifold pressure and temperature, boost pressure, exhaust air/fuel ratio, etc.

At 304, the routine includes confirming an engine cold-start condition. An engine cold-start condition may be confirmed when the engine is started after a prolonged period of engine inactivity while the engine temperature is lower than a threshold (such as below an exhaust catalyst light-off temperature), and while ambient temperatures are below a threshold. During cold-start conditions, expedited engine heating may be desired to reduce cold-start emissions. Additionally, passenger cabin heating may be desired by a vehicle operator.

If engine cold-start conditions are confirmed, in order to expedite exhaust heat recovery, at 306, the exhaust heat recovery system (such as exhaust heat recovery system 150 of FIG. 1) is operated in the first mode. In order to operate the exhaust heat recovery system in the first mode, at 307, a diverter valve, herein referred to as valve_1, (such as diverter valve 171 in FIG. 1) coupled to the main exhaust passage for regulating exhaust flow through the thermal energy storage device (such as thermal energy storage device 170 in FIG. 1), may be actuated to a fully open position disabling direct exhaust flow from the exhaust after-treatment device to the thermal energy storage device.

At 308, a recirculation valve, herein referred to as valve_2, (such as recirculation valve 175 in FIG. 1) coupled to a junction of the exhaust passage downstream of the heat exchanger (such as heat exchanger 174 in FIG. 1, may be actuated to a fully closed position disabling exhaust flow into the recirculation passage. Also, the vent valve (such as vent valve 192 in FIG. 1) in the vent line (such as vent line 190 in FIG. 1) may be maintained closed to disable ambient air-flow into the vent line.

At 310, due to the closed position of valve_1, exhaust exiting the exhaust after-treatment device may not flow through the thermal storage device but may be routed to the heat exchanger via the bypass passage. As the exhaust bypasses the thermal storage device, thermal energy may not be stored in the device and the entire thermal energy may be routed to the heat exchanger. As valve_2 is in a closed position, exhaust flowing through the heat exchanger is released to the atmosphere via the tailpipe, and exhaust may not enter the recirculation passage.

At 337, thermal energy from the exhaust may be transferred to an organic working fluid circulating through the heat exchanger. The heat exchanger may be included as a component of a bottoming cycle, the cycle further comprising an expander, a condenser, a pump, and a battery coupled to the expander. Flowing exhaust through the heat exchanger may include transferring exhaust thermal energy recovered at the heat exchanger to a working fluid of the bottoming cycle at the heat exchanger. The working fluid (exiting the heat exchanger) may then flow through the expander (such as a turbine) of the bottoming cycle wherein the thermal energy may be converted to electrical energy. The electrical energy may be stored in the battery for future use in operating vehicle components. Electrical energy from the battery may be opportunistically utilized for functions such as operating a motor of a compressor, operating a pump, cylinder head heating, vehicle cabin heating and lighting, etc., thereby improving engine performance and vehicle fuel efficiency. In this way, during an engine cold-start, independent of the exhaust thermal energy level, exhaust may be directly routed to the heat exchanger, bypassing the thermal storage device.

If it is confirmed (at 304) that the engine is not operating under cold-start conditions, it may be inferred that the engine has attained a threshold temperature after a cold-start or that the engine is operating under a hot-start condition when the engine temperature is above a threshold temperature and exhaust after treatment device temperature is above its light-off temperature. At 313, thermal energy of exhaust generated by the engine may be estimated as a function of the exhaust temperature (as measured via an exhaust temperature sensor) and exhaust flow-rate (as measured via an exhaust pressure sensor or a dedicated exhaust flow-rate sensor). Alternatively, the controller may determine the exhaust thermal energy based on exhaust temperature and exhaust flow-rate inferred or modeled based on operating conditions such as engine temperature, engine load, engine speed, etc. The controller may determine the exhaust thermal energy through a determination that directly takes into account a determined exhaust temperature and exhaust flow-rate, such as increasing the exhaust thermal energy with increasing exhaust temperature and exhaust flow-rate. The controller may alternatively determine the exhaust thermal energy based on a calculation using a look-up table with the input being each of an exhaust temperature and exhaust flow-rate and the output being exhaust thermal energy. Also, the controller may make a logical determination (e.g., regarding the exhaust thermal energy) based on logic rules that are a function of parameters including exhaust temperature and exhaust flow-rate.

In order to optimally operate the bottoming cycle, it may be desired to maintain the exhaust thermal energy reaching the heat exchanger within the upper and lower limits of a target energy range. By maintaining a steady supply of exhaust thermal energy to the bottoming cycle within the target energy range, an optimal threshold pressure ratio may be maintained at the expander of the bottoming cycle. At 314, the routine includes determining if the thermal energy of exhaust generated by the engine is within the target energy range. The thermal energy may be outside the target energy range due to there being excess thermal energy (where the exhaust thermal energy is higher than an upper limit of the target range) or due there being insufficient thermal energy (where the exhaust thermal energy is below a lower upper limit of the target range).

If it is determined that the exhaust thermal energy is within an upper limit (first threshold) and a lower limit (second threshold) of the target energy range, the routine may move on to 306 to operate the exhaust heat recovery system in the first mode to route exhaust directly to the heat exchanger bypassing the thermal storage device. If it is determined that the exhaust thermal energy is outside the target energy range, at 316, the routine includes determining if the exhaust thermal energy is higher than the upper limit (first threshold) of the target range. If the exhaust thermal energy is higher than the upper limit, it may be inferred that there is excess thermal energy and therefore the entire amount of thermal energy cannot be routed through the heat exchanger due to the possibility of thermal damage to the bottoming cycle components.

In response to the presence of excess thermal energy, at least a portion of the exhaust is directed to the heat exchanger via the thermal storage device wherein the excess thermal energy is stored for later use. For example, the opening of the diverter valve is adjusted so that a portion of the exhaust is directed to the heat exchanger through the thermal storage device while a remainder of the exhaust is directed to the heat exchanger via the bypass passage. As the amount of excess thermal energy increases, the portion of exhaust directed though the thermal storage device is increased while the portion of exhaust directed through the bypass is correspondingly decreased until substantially all the exhaust is directed through the thermal storage device when there is a significant amount of excess thermal energy. In one example, the setting of the diverter valve (whether it is partially open or fully open/closed), and thereby the operating mode of the exhaust heat recovery system, may be selected based on the magnitude of excess thermal energy available.

As an example, at 318, a difference between the exhaust thermal energy and the upper limit of the target energy range may be estimated in order to estimate the amount of excess exhaust thermal energy that cannot be routed through the heat exchanger. This excess exhaust thermal energy may be opportunistically stored in the thermal storage device for later use. At 320, the routine includes comparing the difference to a threshold difference and determining if the difference between the exhaust thermal energy and the upper limit of the target energy range is lower than a threshold difference. The threshold difference may be based on the parameters of the thermal storage device such as the current state of charge of the thermal storage device and its designed thermal energy storage capacity.

If it is determined that the difference is lower than the threshold difference, it may be inferred that there is a small amount of excess thermal energy. The controller may therefore determine that a fraction of the total exhaust amount may be routed through the thermal storage device so that the excess thermal energy from that portion of exhaust may be stored in the device. Once this excess energy is removed from the exhaust, the remaining exhaust energy may be within the target energy range and may be routed via the heat exchanger.

At 322, in order to route a portion of exhaust through the thermal storage device, the exhaust heat recovery system may be operated in a second mode. In order to operate the exhaust heat recovery system in the second mode, at 323, valve_1 may be actuated to a partially open position enabling exhaust flow from the exhaust after-treatment device to the thermal energy storage device. At 324, valve_2 may be actuated to a fully closed position disabling exhaust flow into the recirculation passage. Also, the vent valve in the vent line may be maintained in a closed position to disable ambient air-flow into the vent line.

A degree of opening of the partially open valve_1 may be adjusted so that a first portion of exhaust exiting the exhaust after-treatment device flows directly to the heat exchanger via the bypass passage while a second (remaining) portion of exhaust flows to the heat exchanger via the thermal storage device. The ratio of the first portion to the second portion may be selected based on the difference between the exhaust thermal energy and the upper limit of the target energy range (excess exhaust thermal energy). In particular, the opening of valve_1 may be adjusted so that the second portion provides exhaust flow corresponding to the excess thermal energy that is to be stored at the thermal storage device while the first portion provides exhaust flow corresponding to thermal energy within the target range that is to be routed through the heat exchanger. As an example, the first portion may be increased relative to the second portion as the difference decreases, while the first portion may be decreased relative to the second portion as the difference increases. The controller may adjust the degree of opening of valve_1 to provide the determined ratio of the first portion relative to the second portion. In one example, the controller may send a signal to an actuator coupled to valve_1 to increase the opening of the valve as the first portion decreases.

At 328, thermal energy from the second portion of exhaust flowing through the thermal storage device may be stored in the thermal storage medium (such as a phase change material) of the device, thereby increasing the state of charge of the thermal storage device. In one example, the thermal storage device may store thermal energy by drawing in the thermal energy and using it to change the phase of a larger portion of the thermal storage medium from a solid phase to a liquid phase. The thermal storage device may continue to be charged until the state of charge of the thermal storage device reaches a threshold state of charge (that is, the device is saturated with energy) and cannot further store energy from exhaust flowing through it. This thermal energy may be later discharged to raise the thermal energy of exhaust flowing through the device. After flowing through the storage device, the cooled exhaust may combine with exhaust flowing through the bypass passage upstream of the heat exchanger and then the combination can flow through the heat exchanger. The routine may then proceed to 337 wherein thermal energy from each of the first and second portions of exhaust (combined) may be converted to electrical energy via the bottoming cycle.

If it is determined (at 320) that the difference between the exhaust thermal energy and the upper limit of the target energy range is higher than the threshold difference, it may be inferred that there is a large amount of excess thermal energy. The controller may therefore determine that the excess exhaust thermal energy cannot be routed through the heat exchanger. This excess exhaust thermal energy may be stored in the thermal storage device to be later used.

At 330, in order to route the entire volume of exhaust through the thermal storage device, the exhaust heat recovery system may be operated in a third mode. In order to operate the exhaust heat recovery system in the third mode, at 331, valve_1 may be actuated to a fully closed position disabling exhaust flow from the exhaust after-treatment device to the bypass passage. At 332, valve_2 may be actuated to a fully closed position, disabling exhaust flow into the recirculation passage. Also, the vent valve in the vent line may be maintained in a closed position to disable ambient air-flow into the vent line. Thus it will be appreciated that the third mode may correspond to an extension of the second mode wherein the opening of the diverter valve is decreased until a limit is reached that enables all exhaust to flow through the thermal storage device before reaching the heat exchanger, and no exhaust flow is diverted through the bypass passage.

Due to the closed position of valve_1, exhaust may not flow to the heat exchanger through the bypass passage. At 332, the entire volume of exhaust may flow to the heat exchanger via the thermal storage device. At 334, at least a part of thermal energy from the exhaust flowing through the thermal storage device may be stored in the thermal storage medium of the device. In one example, the amount of energy stored in the thermal storage device may correspond to the excess thermal energy in the exhaust (difference between the exhaust thermal energy and the upper limit of the target energy). In addition, the amount of thermal energy stored in the device may be limited by the state of charge of the device. In one example, the thermal storage device may store thermal energy by drawing in the exhaust thermal energy and using it to change the phase of a larger portion of the thermal storage medium from a solid phase to a liquid phase. The thermal storage device may continue to be charged until the state of charge of the thermal storage device reaches a threshold state of charge (saturation with energy) and thermal energy may no longer be stored at the device until the device is discharged. This thermal energy may be later discharged to raise the thermal energy of exhaust flowing through the device. The routine may then proceed to 337 wherein thermal energy from each of the first and second portions of exhaust (combined) may be converted to electrical energy via the bottoming cycle.

During operation in the third mode, when the state of charge of the thermal storage device reaches the threshold state of charge, the diverter valve (such as diverter 151 in FIG. 1) coupled to the junction of the heat exchanger bypass passage and the main exhaust passage may be partially opened to route a first portion of exhaust exiting the thermal storage device through the heat exchanger bypass passage while a second (remaining) portion of exhaust may flow through the heat exchanger. The controller may adjust the ratio of the first portion to the second portion based on the difference between the exhaust thermal energy and the upper limit of the target energy range. As such, the first portion of exhaust may be increased as the difference between the actual exhaust thermal energy and the upper limit of the target range increases while the first portion of exhaust may be decreased as the difference between the actual exhaust thermal energy and the upper limit of the target range decreases. The opening of the diverter valve may be increased as the first portion increases while the opening of the diverter valve may be decreased as the first portion decreases.

If it is determined (at 316) that the exhaust thermal energy is not above the upper limit of the target energy range, it may be inferred that the exhaust thermal energy is below the thermal energy range, therefore lower than the lower limit (second threshold) of the target energy range. If the exhaust thermal energy is lower than the lower limit, it may be inferred that supplemental energy may have to be added to the exhaust before routing it through the heat exchanger in order to maintain the steady supply of exhaust energy to the bottoming cycle for optimal operation of the cycle. During conditions when the exhaust thermal energy is lower than the lower limit of the target range, operating modes of the exhaust heat exchange system may be selected based on the exhaust flow-rate. Further selection of operating modes and corresponding operations of the exhaust heat exchange system is described in relation to FIG. 4.

In some examples, the operating second and the third operating mode may be combined into a single (e.g., second) operating mode. Operating the exhaust heat recovery system in a second (combined second and third) mode includes opening the diverter valve, closing the recirculation valve, and closing the vent valve closed to flow a first portion of exhaust directly to the heat exchanger bypassing the thermal storage device and a second portion of exhaust to the heat exchanger via the thermal storage device while transferring thermal energy from the second part of exhaust to the thermal storage device. In one example, the first portion of exhaust (routed via the bypass passage) may be reduced such that the entire portion of exhaust may be routed to the heat exchanger via the thermal storage device.

Figure 4:
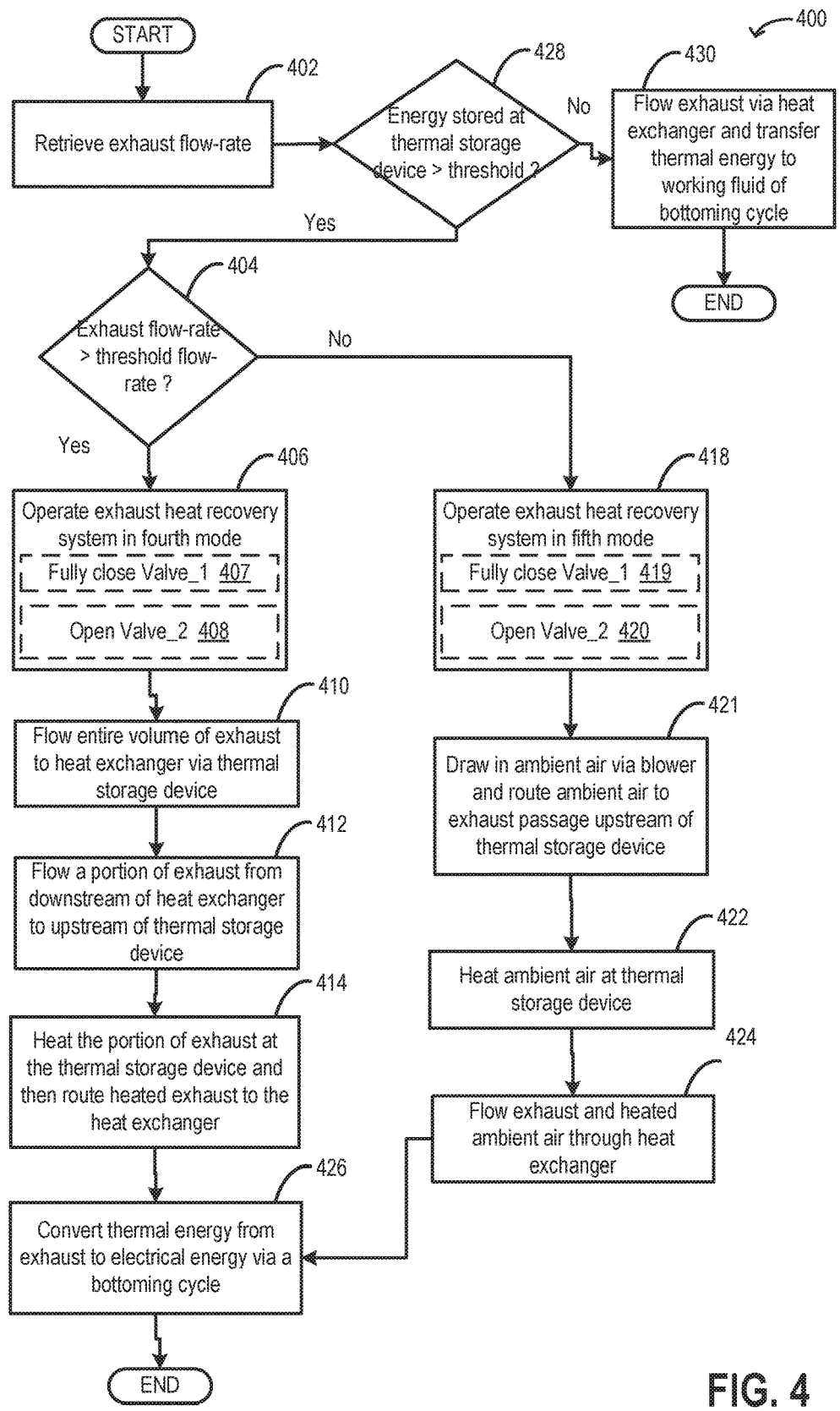
FIG. 4 shows a flow chart illustrating an example method that may be implemented for adjusting exhaust flow through the exhaust heat recovery system of FIG. 1 when there is insufficient exhaust thermal energy available.

FIG. 4 shows an example method 400 that may be implemented for adjusting exhaust flow through the exhaust heat recovery system of FIG. 1. The method of FIG. 4 may be performed as part of the example method 300 of FIG. 3, such as at step 336.

At 402, exhaust flow-rate through the exhaust passage may be retrieved based on inputs from an exhaust pressure sensor or a dedicated exhaust flow-rate sensor. The controller may also compute exhaust flow-rate based on engine operating conditions such as engine temperature, engine speed, engine load, etc. The controller may use a look-up table with engine operating conditions such as engine temperature, engine speed, and engine load, as input and exhaust flow-rate as output.

At 428, the routine includes determining if the thermal energy stored in the thermal storage device is higher than a threshold energy. Thermal energy may have been stored at the device during previous exhaust flow through the device while operating the exhaust heat exchange system in the second and third mode, as described with reference to FIG. 3. The threshold energy may correspond to an energy level at or above which the thermal storage device may be discharged and the stored energy may be drawn from the device. If it is determined that the energy stored at the thermal storage device is lower than the threshold energy, it may be inferred that energy cannot be supplied from the thermal storage device to the exhaust flowing through the device. At 430, exhaust may be routed via the heat exchanger and thermal energy from exhaust may be transferred to the working fluid of bottoming cycle flowing through the heat exchanger. Since the exhaust thermal energy is lower than the second threshold (as determined in step 336 in FIG. 3) heat recovery at the heat exchanger may not be significant. Alternatively, the exhaust the diverter valve (such as diverter 151 in FIG. 1) coupled to the junction of the heat exchanger bypass passage and the main exhaust passage may be completely opened to route the entire portion of exhaust exiting the thermal storage device to the tailpipe through the heat exchanger bypass passage. By bypassing the heat exchanger, exhaust heat recovery may be suspended during lower exhaust thermal energy (lower than second threshold) conditions.

If it is confirmed that the energy stored in the thermal storage device is higher than the threshold energy, the routine includes determining if the flow-rate of exhaust generated by the engine is higher than a threshold flow-rate. The threshold flow-rate may correspond to a minimum exhaust flow-rate requested at the heat exchanger that enables an optimal pressure drop across the expander of the bottoming cycle, as desired for electricity generation. As such, the thermal energy of the exhaust may be lower than the target range due to the exhaust flow rate being low while the exhaust temperature is high, or due to each of the exhaust flow rate and exhaust temperature being low.

If it is determined that the exhaust flow-rate is higher than the threshold flow-rate, it may be inferred that the exhaust flow-rate of through the heat exchanger cannot be further increased by drawing in ambient air. However, exhaust thermal energy can be increased by recirculating a portion of exhaust to upstream of the thermal storage device and heating the exhaust using stored thermal energy drawn from the thermal storage device, thereby maintaining a steady flow of exhaust thermal energy at the heat exchanger. In order to recirculate a portion of exhaust to upstream of the thermal storage device, at 406, the exhaust heat recovery system may be operated in a fourth mode. In order to operate the exhaust heat recovery system in the fourth mode, at 407, valve_1 may be actuated to a fully closed position, disabling exhaust flow from the exhaust after-treatment device into the bypass passage. At 408, valve_2 may be actuated to an open position with a degree of opening of the valve adjusted to enable a desired exhaust flow into the recirculation passage. The vent valve in the vent line may be maintained in a closed position to disable ambient air-flow into the vent line. In this way, the exhaust heat recovery system may transition from operating in the third to operating in the fourth mode responsive to the exhaust thermal energy decreasing to below a second threshold thermal energy, lower than the first threshold thermal energy.

Due to the closed position of valve_1, exhaust may not flow to the heat exchanger through the bypass passage. At 410, the entire volume of exhaust may flow to the heat exchanger via the thermal storage device. Due to the open position of valve_2, at 412, a portion of the cooled exhaust exiting the heat exchanger may enter the recirculation passage and may be routed to the exhaust passage upstream of the thermal storage device. The portion of exhaust recirculated from downstream of the heat exchanger to upstream of the thermal storage device may be based on a difference between the exhaust thermal energy and the lower limit of the target range. In one example, the portion of exhaust recirculated may be increased with an increase in the difference between the exhaust thermal energy and the lower limit of the target range, the portion of exhaust increased by increasing a degree of opening of the recirculation valve coupled to the recirculation passage. In another example, the portion of exhaust recirculated may be decreased with a decrease in the difference between the exhaust thermal energy and the lower limit of the target range, the portion of exhaust decreased by decreasing the degree of opening of the recirculation valve. The recirculated exhaust may combine with the post-catalyst engine exhaust upstream of the thermal storage device and the exhaust mixture may then flow through the thermal storage device. At 414, the portion of exhaust recirculated to the exhaust passage may be heated (along with the remaining exhaust in the mixture) by drawing thermal energy (previously stored in the thermal storage device during operation in second and third mode) from the thermal storage device. While operating in this mode, the thermal storage device may discharge and the thermal energy may be transferred to the exhaust flowing through it. In one example, the thermal storage device may discharge thermal energy by losing thermal energy from the liquid phase thermal storage medium to the cooler exhaust flowing through the device, thereby causing a larger portion of the thermal storage medium to transition from a liquid phase to a solid phase. The heated exhaust mixture with elevated thermal energy within the target range may then be routed to the heat exchanger.

At 426, thermal energy from the heated exhaust mixture may be transferred to an organic working fluid circulating through the heat exchanger. The working fluid may then flow through an expander (such as a turbine) of the bottoming cycle wherein the thermal energy may be converted to electrical energy. The electrical energy may be stored in a battery coupled to the expander for future use in operating vehicle components. Electrical energy from the battery may be opportunistically utilized for functions such as operating a motor of a compressor, operating a pump, cylinder head heating, vehicle cabin heating and lighting, etc., thereby improving engine and fuel efficiency.

Returning to 404, if it is determined that the exhaust flow-rate is lower than the threshold flow-rate, it may be inferred that the flow-rate of exhaust flowing through the heat exchanger may have to be increased by drawing in ambient air in order to reach the optimal exhaust flow-rate as desired for efficient exhaust heat recovery. Also, for hybrid vehicles, during engine-off conditions, when there is no exhaust flow, ambient air may be drawn in to maintain a steady flow through the heat exchanger. In order to draw in ambient air and route the air to upstream of the thermal storage device, at 418, the exhaust heat recovery system may be operated in a fifth mode. In order to operate the exhaust heat recovery system in the fifth mode, at 419, valve_1 may be actuated to a fully closed position disabling exhaust flow from the exhaust after-treatment device into the bypass passage. At 420, valve_2 may be actuated to an open position enabling exhaust flow into the recirculation passage, a degree of opening of the valve adjusted to enable a desired exhaust flow into the recirculation passage. The vent valve in the vent line may be actuated to an open position to enable ambient air-flow into the vent line. In this way, the exhaust heat recovery system may transition from the fourth operating mode to the fifth operating mode responsive to a drop in the exhaust flow-rate.

Due to the closed position of valve_1, exhaust may not flow to the heat exchanger through the bypass passage. The entire volume of exhaust may flow to the heat exchanger via the thermal storage device. Due to the opening of the vent valve, at 421, ambient air may be drawn into the valve passage via the vent valve. An amount of air drawn in via the blower may be based on the difference between the exhaust thermal energy and the lower limit of the target range. In one example, the amount of ambient air drawn in may be increased as the difference between the exhaust thermal energy and the lower limit of the target range increases, the amount of air drawn increased by increasing one or more of an opening of the vent valve and an output of the blower. The energy used for operating the blower to draw in the exhaust may be lower than the additional electrical energy generated at the bottoming cycle (from the steady higher than threshold exhaust flow-rate), thereby making the overall exhaust heat recovery process energy efficient. The ambient air may then be routed to the exhaust passage upstream of the thermal storage device. In one example, due to the open position of valve_2, a portion of the cooled exhaust exiting the heat exchanger may enter the recirculation passage and may be routed to the exhaust passage upstream of the thermal storage device to further increase the exhaust flow-rate. The portion of exhaust recirculated from downstream of the heat exchanger to upstream of the thermal storage device may be based on each of the difference between the exhaust thermal energy and the lower limit of the target range and the exhaust flow-rate. In one example, the portion of exhaust recirculated may be increased with an increase in the difference between the exhaust thermal energy and the lower limit of the target range and a decrease in the flow-rate, the portion of exhaust increased by increasing a degree of opening of the recirculation valve coupled to the recirculation passage. In another example, the portion of exhaust recirculated may be decreased with a decrease in the difference between the exhaust thermal energy and the lower limit of the target range and an increase in the flow-rate, the portion of exhaust decreased by decreasing the degree of opening of the recirculation valve. By increasing the portion of exhaust recirculated, the amount of ambient air drawn in may be reduced. As such, during a lower than threshold exhaust flow-rate, the entire volume of exhaust exiting the heat exchanger may be recirculated. The ambient air and the recirculated exhaust may combine with the exhaust upstream of the thermal storage device and the air-exhaust mixture may then flow through the thermal storage device. In another example, in the fifth mode, valve_2 may be closed, and exhaust may not be recirculated from downstream of the heat exchanger to upstream of the heat exchanger, and only ambient air drawn in via the vent line may be used to boost the exhaust flow-rate.

At 422, ambient air along with the portion of exhaust recirculated to the exhaust passage may be heated (along with the remaining exhaust in the mixture) by drawing thermal energy (previously stored in the thermal storage device during operation in second and third mode) from the thermal storage device. While operating in this mode, the thermal storage device may discharge and the thermal energy may be transferred to the air and exhaust mixture flowing through it. In one example, the thermal storage device may discharge thermal energy by losing thermal energy from the liquid phase thermal storage medium to the cooler exhaust flowing through the device, thereby causing a larger portion of the thermal storage medium to transition from a liquid phase to a solid phase. The heated exhaust mixture with elevated thermal energy within the target range may then be routed to the heat exchanger.

At 424, the heated air and exhaust mixture with thermal energy within the target range may then be routed via the heat exchanger. In this way, during a lower than a lower limit of the target range (second threshold) exhaust thermal energy and a lower than threshold exhaust flow-rate, exhaust flow rate through the heat exchanger may be increased by drawing ambient air into the exhaust, upstream of the thermal storage device, the ambient air may be mixed with the exhaust, and then an air-exhaust mixture may be routed through the heat exchanger, wherein the thermal input to the heat exchanger is maintained within the upper and lower limits (between first and second threshold) of the target range.

The routine may then proceed to 426, wherein thermal energy from the air and exhaust mixture may be transferred to the working fluid circulating via the heat exchanger to be converted to electrical energy. As an example, during operation in each of the fourth and fifth modes, if the thermal storage device is completely discharged and the energy stored reduces to below the threshold energy, exhaust heat recovery may be suspended by deactivating cooling (working) fluid circulation via the heat exchanger (as discussed in step 430).

In this way, during a higher than first threshold exhaust thermal energy, thermal energy may be stored from at least a portion of exhaust at a thermal energy storage device, and then exhaust may be routed through a heat exchanger; and during a lower than second threshold exhaust thermal energy and a lower than threshold exhaust temperature, a portion of exhaust may be recirculated from downstream of the heat exchanger to upstream of the thermal storage device, thermal energy may be drawn into the exhaust from the thermal storage device before flowing the exhaust through the heat exchanger; wherein during each of the first and second condition, a thermal input from the exhaust into the heat exchanger is maintained.

FIG. 6 shows an example operating sequence 600 illustrating operation of the exhaust heat recovery system of FIG. 1. Exhaust flow through a thermal storage device, a bypass passage, and an exhaust recirculation passage may be adjusted to maintain a steady thermal input from exhaust to the heat exchanger. The horizontal (x-axis) denotes time and the vertical markers t1-t6 identify significant times in the operation of the engine exhaust system.

The first plot, line 602, shows variation in engine load over time, as estimated via inputs of a pedal position sensor. The second plot, line 604, shows exhaust temperature as estimated via inputs of an exhaust temperature sensor. The third plot, line 606, shows exhaust flow-rate as estimated via inputs of one or more of an exhaust pressure sensor and a dedicated exhaust flow-rate sensor. Dotted line 607 shows a threshold exhaust flow-rate below which a bottoming cycle comprising the heat exchanger may not be efficiently operated. The fourth plot, line 608, shows the state of charge of the thermal storage device. Dotted line 613 shows a threshold state of charge at which the thermal storage device is statured with thermal energy and beyond this threshold it is not possible to further charge the device. The fifth plot, line 610, shows exhaust thermal energy input into the heat exchanger. The exhaust thermal energy may be estimated based on exhaust temperature and flow-rate. In order to maintain the operating efficiency of the bottoming cycle, the exhaust thermal energy may be maintained within a target energy range, the target energy range defined by a lower limit 609 and an upper limit 611. Dashed line 612 shows the exhaust thermal energy input to the heat exchanger if the entire volume of exhaust is directly routed to the heat exchanger (bypassing the thermal storage device) and if exhaust if not recirculated from downstream of the heat exchanger to upstream of the thermal storage device. The sixth plot, line 614, shows a position of a first diverter valve (valve_1) coupled to the exhaust passage (such as first diverter valve 171 in FIG. 1). By adjusting the position of the diverter valve, a controller regulates the portion of exhaust that flows via the thermal storage device. The seventh plot, line 616, shows a position of a recirculation valve (valve_2, such as recirculation valve 175 in FIG. 1) coupled to the exhaust recirculation passage. By adjusting the position of the recirculation valve, the controller regulates the portion of exhaust that is recirculated from downstream of the heat exchanger to upstream of the thermal storage device via a blower. The eighth plot, line 618, shows a position of a second diverter valve (valve_3) coupled to the main exhaust passage (such as second diverter valve 151 in FIG. 1). By adjusting the position of the second diverter valve, the controller regulates the portion of exhaust that bypasses the heat exchanger.

Prior to time t1, the engine is shut down and the vehicle is not propelled using engine torque. At time t1, in response to an operator torque request, the engine is restarted from rest after a period of inactivity. At engine start, the exhaust catalyst may not have attained its light-off temperature and engine heating and passenger cabin heating may be desired. Based on the lower than light-off catalyst temperature, engine cold-start conditions may be inferred. In order to expedite exhaust heat recovery for engine and/or passenger cabin heating during the cold-start, at t1, valve_1 may be fully opened to route the entire volume of exhaust directly to the heat exchanger bypassing the thermal storage device. Between time t1 and t2, since exhaust does not flow through the thermal storage device, thermal energy is not stored in the device, and the state of charge of the device remains substantially constant. Between t1 and t2, due to the increase in engine load, there may be a corresponding increase in the exhaust flow-rate (plot 606) to higher than threshold flow-rate 607 and therefore the exhaust thermal energy input to the heat exchanger (plot 610) may be within the target range (between 609 and 611). As exhaust flows through the heat exchanger, thermal energy is transferred to an organic fluid circulating through the heat exchanger, and electrical energy is generated from the thermal energy via a bottoming cycle of which the heat exchanger is a part. The electrical energy may then be stored in a battery coupled to an expander of the bottoming cycle. The electrical energy from the battery may be used at a later time for engine operation, such as for engine heating and/or cabin heating. The valve_2 may be maintained in a closed position between t1 and t2 so that exhaust is not recirculated from downstream of the heat exchanger to upstream of the thermal storage device via the blower. By not operating the blower, energy may be conserved during cold-start conditions.

At time t2, responsive to an increase in exhaust temperature and exhaust flow-rate, it may be determined that the thermal energy of the exhaust has increased. At this time, if the entire volume of exhaust was routed via the heat exchanger (as shown by dashed line 612), the thermal energy input to the heat exchanger may have exceeded the upper limit 611 of the target range. In order to maintain the exhaust thermal energy input to the heat exchanger within the target range, at t2, a degree of opening of valve_1 is reduced so that a first portion of exhaust is directed to the heat exchanger bypassing the thermal storage device while the remaining (second) portion of exhaust flows to the heat exchanger via the thermal storage device. Between time t2 and t3, since only the second portion of exhaust flows through the thermal storage device, thermal energy from only the second portion of exhaust is stored in the thermal storage device, thereby charging the device. As the thermal energy is transferred to the thermal storage device, the thermal storage device is charged (state of charge remains within threshold 613). In addition, the thermal energy of the second portion of exhaust is not input to the heat exchanger. Only the thermal energy from the first portion of exhaust is input to the heat exchanger. By reducing the portion of exhaust that is directly delivered to the heat exchanger, and storing a part of the total exhaust thermal energy at the thermal storage device, the thermal energy input into the heat exchanger is maintained within the target range.

At time t3, responsive to a further increase in engine load (due to an increase in operator torque demand), there is a corresponding increase in exhaust temperature and exhaust flow-rate. If the entire volume of exhaust was routed via the heat exchanger (as shown by dashed line 612), the thermal energy input to the heat exchanger may have exceeded the upper limit 611 of the target range. Due to the increase in exhaust temperature and flow-rate, an even larger amount of thermal energy may be transferred to the thermal storage device in order to maintain the exhaust thermal energy input to the heat exchanger within the target limit. Therefore, in order to route the entire amount of exhaust through the thermal storage device such that an increased amount of energy is transferred to the thermal energy storage device, valve_1 is actuated to a fully closed position.

Between time t3 and t4, since the thermal storage device state of charge is below the threshold 613, thermal energy from the entire volume of exhaust flowing through the thermal storage device is stored in the storage medium of the thermal storage device, thereby continuing to charge the device. As exhaust flows through the heat exchanger, exhaust heat may be continued to be transferred to the working fluid of the bottoming cycle and electrical energy may be generated (and stored in the battery) from the thermal energy.

At time t4, the state of charge of the thermal storage device state of charge reaches the threshold 613 and further thermal energy may not be stored in the device. However, if the entire volume of exhaust was routed via the heat exchanger, the thermal energy input to the heat exchanger will exceeded the upper limit 611 of the target range and may cause degradation to the bottoming cycle components. Therefore, at time t4, valve_3 may be actuated to a partially open position to route a first portion of exhaust via the heat exchanger bypass passage while the second (remaining) portion of exhaust may be may be routed through the heat exchanger. The opening of valve_3 may be adjusted based on the difference between the thermal energy of exhaust and the upper limit 611 of the target range. Between time t4 and t5, exhaust thermal energy may be transferred from the second portion of exhaust flowing through the heat exchanger to the working fluid of the bottoming cycle and electrical energy may be generated. At time t5, there may be a decrease in engine load due to a decrease in operator torque demand. The drop in engine load causes a corresponding decrease in exhaust temperature and exhaust flow-rate. Due to the decrease in exhaust temperature and flow-rate, there is a drop in the exhaust thermal energy. Due to the drop in thermal energy, it may be inferred that if the entire volume of exhaust was routed via the heat exchanger (as shown by dashed line 612), the thermal energy input to the heat exchanger may have been lower than the lower limit of the target range. Since the thermal storage device has sufficient thermal energy stored in it, it may be possible to withdraw heat from the thermal storage device to raise the thermal energy of exhaust. Therefore, in order to increase the exhaust thermal energy input to the heat exchanger (to within the target range), at t4, valve_3 may be closed. Valve_2 may be opened to recirculate at least a portion of exhaust exiting the heat exchanger to upstream of the thermal storage device. By adjusting the opening of valve_2, the amount of cold exhaust that is recirculated to the thermal storage device is increased, thereby increasing the amount of thermal energy transferred from the thermal storage device to the exhaust stream. In one example, the opening of valve_2 may be adjusted so that the amount of thermal energy transferred out of the thermal storage device corresponds to at least the difference between the current (lower) exhaust thermal energy level and the lower limit 609 of the target range, so that the thermal energy level of exhaust exiting the storage device and heading to the heat exchanger is within the target range. In one example, the opening of valve_2 may be increased so that a larger portion of exhaust is recirculated and the amount of thermal energy transferred increases as the difference between the current thermal energy level and the lower limit 609 increases. Also, the valve_1 may be maintained in the fully closed position to route the entire volume of exhaust (generated at the engine and recirculated from downstream of the heat exchanger) through the thermal storage device. Between time t5 and t6, the thermal storage device may be operated in the discharge mode. The portion of cooled exhaust recirculated from downstream of the heat exchanger to upstream of the thermal storage device may combine with post-catalyst exhaust and then the combined exhaust stream may flow through the thermal storage device wherein the exhaust stream may be heated by withdrawing previously stored thermal energy from the thermal storage device. The heated exhaust stream may then be routed through the heat exchanger wherein the thermal energy may be transferred to the working fluid of the bottoming cycle.

At time t6, there may be a further decrease in engine load due to a further decrease in operator torque demand. The drop in engine load causes a corresponding decrease in exhaust temperature and exhaust flow-rate. At this time, the exhaust flow-rate may decrease to below threshold flow-rate 607. Based on the decrease in exhaust flow-rate and the lower exhaust temperature, it may be inferred that if the entire volume of exhaust was routed via the heat exchanger (as shown by dashed line 612) the thermal energy input to the heat exchanger may have been lower than the lower limit of the target range. Since the thermal storage device has sufficient thermal energy stored in it, it may be possible to withdraw heat from the thermal storage device to raise the thermal energy of exhaust. Therefore, in order to increase the exhaust thermal energy input to the heat exchanger (to within the target range), the valve_2 may be fully opened to Recirculate the entire amount of exhaust exiting the heat exchanger. As the portion of recirculated exhaust increases, an increased amount of thermal energy may be transferred from the thermal storage device to the exhaust. However, even if the entire volume of exhaust is recirculated, the flow-rate of exhaust reaching the heat exchanger may not increase to above the threshold 607. Therefore, a vent valve in a vent line coupled to the recirculation line may be opened and a blower coupled to the vent line may be operated to draw in ambient air to supplement the exhaust flow-rate reaching the heat exchanger. The ambient air may then be routed to the thermal storage device via the recirculation passage. The valve_1 may be maintained in fully closed position to route the entire volume of exhaust through the thermal storage device wherein the ambient air is heated using thermal energy previously stored in the thermal storage device. Between time t6 and t7, the thermal storage device is be operated in the discharge mode. The heated ambient air mixed with the exhaust (generated at the engine and recirculated from downstream of the heat exchanger) is then routed through the heat exchanger wherein the thermal energy may be transferred to the working fluid of the bottoming cycle. In this way, even during conditions of lower than threshold flow-rate and a lower than lower limit exhaust thermal energy, by opportunistically drawing in ambient air and recirculation exhaust, the exhaust heat energy reaching the heat exchanger is maintained within the target range.

At time t7, there may be an increase in engine load due to increase in driver torque demand and correspondingly exhaust temperature and exhaust flow-rate may increase. Based on the exhaust temperature and exhaust flow-rate, it may be inferred that if the entire volume of exhaust was routed via the heat exchanger (as shown by dashed line 612) the thermal energy input to the heat exchanger may have exceeded the upper limit of the target range. Therefore, in order to reduce the exhaust thermal energy input to the heat exchanger, valve_1 may be is maintained in the closed position such that the entire volume of exhaust is routed to the heat exchanger via the thermal storage device. Since the thermal storage device state of charge is below the threshold 613, thermal energy from the entire volume of exhaust flowing through the thermal storage device is stored in the storage medium of the thermal storage device, thereby continuing to charge the device. Since exhaust recirculation is not desired at this time due to increased exhaust thermal energy, valve_2 may be actuated to a closed position. After t7, thermal energy input to the heat exchanger may be maintained within the target range and exhaust heat is transferred to the working fluid of the bottoming cycle and electrical energy is generated (and stored in the battery) from the thermal energy In this way, by storing a part of the thermal energy from the exhaust at the thermal storage device, the thermal energy input in to the heat exchanger may be maintained within the target range.

In this way, by maintaining a steady supply of exhaust thermal energy delivered to a heat exchanger within a target range, a target pressure ratio may be maintained at an expander of a bottoming cycle including the heat exchanger. As a result, the electrical energy generating efficiency of the bottoming cycle can be maintained at a high level, improving fuel economy. The technical effect of storing excess thermal energy at a thermal storage device upstream of the heat exchanger during condition when there is excess exhaust thermal energy (due to high exhaust temperatures or flow rates) is that the thermal energy level can be reduced to the target range while the stored energy can be opportunistically withdrawn during conditions when there is insufficient exhaust thermal energy (due to low exhaust temperatures or low rates). In addition, by limiting the flow of excess thermal energy reaching the heat exchanger, thermal degradation of bottoming cycle components is reduced. By recirculating cooled exhaust from downstream of the heat exchanger to upstream of a charged thermal storage device, exhaust temperature levels can be raised. By operating a blower to add ambient air to the recirculated exhaust before the mixture is recirculated to the thermal storage device, both an exhaust temperature and an exhaust flow rate can be raised, allowing for a larger increase in thermal energy levels. The technical effect of flowing exhaust to the heat exchanger while bypassing the thermal storage device during cold-start conditions is that all the exhaust thermal energy can be directed to the heat exchanger to expedite engine heating, reducing engine cold-start emissions. Overall, exhaust heat recovery efficiency is improved and engine performance is enhanced.

An example engine method comprises: when exhaust thermal energy is higher than a first threshold, flowing exhaust through a heat exchanger after storing a portion of the thermal energy at a thermal energy storage device upstream of the heat exchanger, and when exhaust thermal energy is lower than a second threshold, flowing exhaust through the heat exchanger after drawing thermal energy from the thermal energy storage device. In any preceding example, additionally or optionally, the exhaust thermal energy is determined as a function of exhaust temperature and exhaust flow-rate. In any or all of the preceding examples, additionally or optionally, the heat exchanger is included in a bottoming cycle, the cycle further comprising an expander, a condenser, a pump, and a battery coupled to the expander, and wherein flowing exhaust through the heat exchanger includes transferring heat from the exhaust to a working fluid of the bottoming cycle at the heat exchanger. In any or all of the preceding examples, additionally or optionally, the first threshold is higher than the second threshold, and wherein each of the first and the second threshold are based on a parameter of the bottoming cycle, the parameter including a pressure drop across the expander, a nature of the working fluid, and a temperature of the working fluid. Any or all of the preceding examples further comprising, additionally or optionally, when exhaust thermal energy is between the first threshold and the second threshold, flowing exhaust to the heat exchanger via a bypass passage, while bypassing the thermal storage device. In any or all of the preceding examples, additionally or optionally, when exhaust thermal energy is higher than the first threshold, flowing exhaust through the heat exchanger includes flowing a first portion of exhaust directly to the heat exchanger bypassing the thermal storage device and concurrently flowing a second portion of exhaust to the heat exchanger via the thermal storage device, wherein the portion of thermal energy stored in the thermal storage device is derived from the second portion of exhaust. Any or all of the preceding examples further comprising, additionally or optionally, when exhaust thermal energy is lower than the second threshold: during a first condition, recirculating a portion of exhaust from downstream of the heat exchanger to upstream of the thermal storage device, mixing the recirculated exhaust with exhaust generated by the engine to form a combined exhaust flow, heating the combined exhaust flow by drawing thermal energy from the thermal storage device, and then flowing the combined exhaust flow through the heat exchanger; and during a second condition, drawing in ambient air via a blower coupled to a vent line, routing the ambient air to upstream of the thermal storage device, mixing the ambient air with exhaust generated by the engine to form the combined exhaust flow, heating the combined exhaust flow by drawing thermal energy from the thermal storage device, and then flowing the combined exhaust flow through the heat exchanger. In any or all of the preceding examples, additionally or optionally, wherein the thermal storage device includes a phase change material, wherein storing thermal energy includes transitioning the phase change material from a solid phase to a liquid phase, and wherein discharging thermal energy includes transitioning the phase change material from the liquid phase to the solid phase. In any or all of the preceding examples, additionally or optionally, the first condition includes a lower than second threshold thermal energy due to a lower than threshold exhaust temperature and a higher than threshold exhaust flow-rate, and the second condition includes a lower than second threshold thermal energy due to a higher than threshold exhaust temperature and a lower than threshold exhaust flow-rate. In any or all of the preceding examples, additionally or optionally, the portion of exhaust recirculated from downstream of the heat exchanger to upstream of the thermal storage device is based on a difference between the exhaust thermal energy and the second threshold, the portion increased with an increase in the difference between the exhaust thermal energy and the second threshold, the portion of exhaust increased by increasing an opening of a recirculation valve coupled to a recirculation passage. In any or all of the preceding examples, additionally or optionally, an amount of air drawn in via the blower is based on the difference between the exhaust thermal energy and the second threshold, the amount increased as the difference between the exhaust thermal energy and the second threshold increases, the amount of air drawn increased by increasing one or more of an opening of a vent valve and an output of the blower. Any or all of the preceding examples further comprising, additionally or optionally, during an engine cold-start, independent of the exhaust thermal energy, flowing exhaust directly to the heat exchanger, bypassing the thermal storage device.

Another example engine method comprises: during a first condition, storing thermal energy from at least a portion of exhaust at a thermal energy storage device, and then flowing exhaust through a heat exchanger; and during a second condition, recirculating a portion of exhaust from downstream of the heat exchanger to upstream of the thermal storage device, drawing thermal energy into the exhaust from the thermal storage device before flowing the exhaust through the heat exchanger; wherein during each of the first and second condition, a thermal input from the exhaust into the heat exchanger is maintained. Any of the preceding examples further comprises, additionally or optionally, during a third condition, increasing exhaust flow rate through the heat exchanger by drawing ambient air into the exhaust, upstream of the thermal storage device, mixing the ambient air with the exhaust, and then flowing an air-exhaust mixture through the heat exchanger, wherein the thermal input is also maintained in the third condition. In any or all of the preceding examples, additionally or optionally, the first condition includes a higher than first threshold exhaust thermal energy, the second condition includes a lower than second threshold exhaust thermal energy and a lower than threshold exhaust temperature, and the third condition includes a lower than second threshold exhaust thermal energy and a lower than threshold exhaust flow-rate, wherein the exhaust thermal energy is based on each of an exhaust temperature and an exhaust flow-rate, the exhaust thermal energy increasing with increase in at least one of the exhaust temperature and the exhaust flow-rate, and wherein maintaining the thermal input includes maintaining the exhaust thermal energy within the first and second threshold exhaust thermal energy, wherein the first threshold is higher than the second threshold. Any or all of the preceding examples further comprising, additionally or optionally, during a fourth condition, when the exhaust thermal energy is between the first and second thresholds, flowing exhaust to the heat exchanger while bypassing the thermal storage device. In any or all of the preceding examples, additionally or optionally, during exhaust flow through the heat exchanger, thermal energy is transferred to an organic fluid circulating through the heat exchanger, electrical energy is generated from the thermal energy via a bottoming cycle including the heat exchanger, and the electrical energy is stored in a battery coupled to an expander of the bottoming cycle.

In yet another example, an engine system coupled to a vehicle comprises: an engine intake manifold; an engine exhaust system including an exhaust temperature sensor and an exhaust pressure sensor coupled to a main exhaust passage, a bypass passage coupled to the maintain exhaust passage, across a thermal storage device, and a recirculation passage including a blower for recirculating exhaust from downstream of a heat exchanger to upstream of the thermal storage device; an exhaust heat recovery system including the thermal storage device coupled to the exhaust passage, the heat exchanger coupled downstream of the thermal storage device, a bottoming cycle including the heat exchanger, an expander coupled to a battery, a condenser, and a pump for circulating a working fluid through the bottoming cycle; a vent line including a vent valve coupled to the recirculation passage; a diverter valve coupled to the exhaust passage for regulating exhaust flow via the bypass passage; a recirculation valve coupled to the recirculation passage for regulating recirculation of exhaust downstream of the heat exchanger to upstream of the thermal storage device. The engine system further comprises a controller with computer readable instructions stored on non-transitory memory for: operating the exhaust heat recovery system in a first mode with the diverter valve closed, the recirculation valve closed, and the vent valve closed to flow exhaust directly to the heat exchanger, bypassing the thermal storage device; and operating the exhaust heat recovery system in a second mode with the diverter valve open, the recirculation valve closed, and the vent valve closed to flow a first portion of exhaust directly to the heat exchanger bypassing the thermal storage device and a second portion of exhaust to the heat exchanger via the thermal storage device while transferring thermal energy from the second part of exhaust to the thermal storage device; and transitioning from the first to the second mode responsive to an increase in an estimated exhaust thermal energy above a first threshold thermal energy, the thermal energy of the exhaust estimated based on inputs from the exhaust temperature and pressure sensors. In any preceding example, additionally or optionally, the controller includes further instructions for: operating the exhaust heat recovery system in a third mode with the diverter valve closed, the recirculation valve open, and the vent valve closed to flow at least a portion of exhaust from downstream of the heat exchanger to upstream of the thermal storage device, mixing the portion of exhaust with exhaust generated from the engine, heating an exhaust mixture by drawing thermal energy from the thermal storage device, and then flowing the exhaust mixture through the heat exchanger; operating the exhaust heat recovery system in a fifth mode with the diverter valve closed, the recirculation valve open, and the vent valve open to draw ambient air via the vent line, mixing the ambient air with exhaust generated from the engine, heating an exhaust and air mixture by drawing thermal energy from the thermal storage device, and then flowing the exhaust and air mixture through the heat exchanger; transitioning from the second to the third mode responsive to the exhaust thermal energy decreasing below a second threshold thermal energy, lower than the first threshold thermal energy; and transitioning from the third to the fourth mode responsive to a drop in the exhaust flowrate. In any or all of the preceding examples, additionally or optionally, during each of the first, second, third, and fourth modes, thermal energy from exhaust or the exhaust and air mixture flowing through the heat exchanger is transferred to the working fluid, the fluid then routed via the expander of the bottoming cycle wherein electrical energy is generated from the thermal energy and the electrical energy is stored in the battery.

In a further representation, an engine system coupled to a vehicle, comprises: an engine intake manifold, an engine exhaust system including an exhaust temperature sensor and an exhaust pressure sensor coupled to a main exhaust passage, a bypass passage coupled to the maintain exhaust passage, across a thermal storage device, and a recirculation passage including a blower for recirculating exhaust from downstream of a heat exchanger to upstream of the thermal storage device, an exhaust heat recovery system including the thermal storage device coupled to the exhaust passage, the heat exchanger coupled downstream of the thermal storage device, a bottoming cycle including the heat exchanger, an expander coupled to a battery, a condenser, and a pump for circulating a working fluid through the bottoming cycle, a vent line including a vent valve coupled to the recirculation passage, a diverter valve coupled to the exhaust passage for regulating exhaust flow via the bypass passage, a recirculation valve coupled to the recirculation passage for regulating recirculation of exhaust downstream of the heat exchanger to upstream of the thermal storage device, and a controller with computer readable instructions stored on non-transitory memory for: operating the exhaust heat recovery system in a first mode with the diverter valve closed, the recirculation valve closed, and the vent valve closed to flow exhaust directly to the heat exchanger, bypassing the thermal storage device. In any preceding example, additionally or optionally, the controller includes further instructions for: operating the exhaust heat recovery system in a second mode with the diverter valve open, the recirculation valve closed, and the vent valve closed to flow a first portion of exhaust directly to the heat exchanger bypassing the thermal storage device and a second portion of exhaust to the heat exchanger via the thermal storage device while transferring thermal energy from the second part of exhaust to the thermal storage device; and transitioning from the first to the second mode responsive to an increase in an estimated exhaust thermal energy above a first threshold thermal energy, the thermal energy of the exhaust estimated based on inputs from the exhaust temperature and pressure sensors. In any or all of the preceding examples, additionally or optionally, the controller includes further instructions for: operating the exhaust heat recovery system in a third mode with the diverter valve closed, the recirculation valve closed, and the vent valve closed to flow exhaust directly to the heat exchanger bypassing the thermal storage device, and transitioning from the second to the third mode responsive to an increase in a difference between the estimated exhaust thermal energy and the first threshold thermal energy to above a threshold difference. In any or all of the preceding examples, additionally or optionally, the controller includes further instructions for: operating the exhaust heat recovery system in a fourth mode with the diverter valve closed, the recirculation valve open, and the vent valve closed to flow at least a portion of exhaust from downstream of the heat exchanger to upstream of the thermal storage device, mixing the portion of exhaust with exhaust generated from the engine, heating an exhaust mixture by drawing thermal energy from the thermal storage device, and then flowing the exhaust mixture through the heat exchanger; operating the exhaust heat recovery system in a fifth mode with the diverter valve closed, the recirculation valve open, and the vent valve open to draw ambient air via the vent line, mixing the ambient air with exhaust generated from the engine, heating an exhaust and air mixture by drawing thermal energy from the thermal storage device, and then flowing the exhaust and air mixture through the heat exchanger; transitioning from the second mode or third mode to the fourth mode responsive to the exhaust thermal energy decreasing below a second threshold thermal energy, lower than the first threshold thermal energy; and transitioning from the fourth to the fifth mode responsive to a drop in the exhaust flow-rate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
  in response to an exhaust thermal energy being higher than a first threshold, flowing exhaust through a heat exchanger to maintain a target thermal energy input to the heat exchanger after storing a portion of the thermal energy at a thermal energy storage device upstream of the heat exchanger; and
  in response to the exhaust thermal energy being lower than a second threshold, flowing exhaust through the heat exchanger to maintain the target thermal energy input to the heat exchanger after drawing thermal energy from the thermal energy storage device, the first threshold being higher than the second threshold.

2. The method of claim 1, wherein the exhaust thermal energy is determined as a function of exhaust temperature and exhaust flow-rate.

3. The method of claim 1, wherein the heat exchanger is included in a bottoming cycle, the cycle further comprising an expander, a condenser, a pump, and a battery coupled to the expander, and wherein flowing exhaust through the heat exchanger includes transferring heat from the exhaust to a working fluid of the bottoming cycle at the heat exchanger.

4. The method of claim 3, wherein each of the first and the second threshold are based on a parameter of the bottoming cycle, the parameter including a pressure drop across the expander, a nature of the working fluid, and a temperature of the working fluid.

5. The method of claim 1, further comprising, when exhaust thermal energy is between the first threshold and the second threshold, flowing exhaust to the heat exchanger via a bypass passage, while bypassing the thermal storage device.

6. The method of claim 1, wherein, when exhaust thermal energy is higher than the first threshold, flowing exhaust through the heat exchanger includes flowing a first portion of exhaust directly to the heat exchanger, bypassing the thermal storage device, and concurrently flowing a second portion of exhaust to the heat exchanger via the thermal storage device, wherein the portion of thermal energy stored in the thermal storage device is derived from the second portion of exhaust.

7. The method of claim 1, further comprising, when exhaust thermal energy is lower than the second threshold:
  during a first condition, recirculating a portion of exhaust from downstream of the heat exchanger to upstream of the thermal storage device, mixing the recirculated exhaust with exhaust generated by the engine to form a combined exhaust flow, heating the combined exhaust flow by drawing thermal energy from the thermal storage device, and then flowing the combined exhaust flow through the heat exchanger; and
  during a second condition, drawing in ambient air via a blower coupled to a vent line, routing the ambient air to upstream of the thermal storage device, mixing the ambient air with exhaust generated by the engine to form the combined exhaust flow, heating the combined exhaust flow by drawing thermal energy from the thermal storage device, and then flowing the combined exhaust flow through the heat exchanger.

8. The method of claim 7, wherein the thermal storage device includes a phase change material, wherein storing thermal energy includes transitioning the phase change material from a solid phase to a liquid phase, and wherein discharging thermal energy includes transitioning the phase change material from the liquid phase to the solid phase.

9. The method of claim 7, wherein the first condition includes a lower than second threshold thermal energy due to a lower than threshold exhaust temperature and a higher than threshold exhaust flow-rate, and the second condition includes a lower than second threshold thermal energy due to a higher than threshold exhaust temperature and a lower than threshold exhaust flow-rate.

10. The method of claim 7, wherein the portion of exhaust recirculated from downstream of the heat exchanger to upstream of the thermal storage device is based on a difference between the exhaust thermal energy and the second threshold, the portion increased with an increase in the difference between the exhaust thermal energy and the second threshold, the portion of exhaust increased by increasing an opening of a recirculation valve coupled to a recirculation passage.

11. The method of claim 10, wherein an amount of ambient air drawn in via the blower is based on the difference between the exhaust thermal energy and the second threshold, the amount increased as the difference between the exhaust thermal energy and the second threshold increases, the amount of ambient air drawn increased by increasing one or more of an opening of a vent valve and an output of the blower.

12. The method of claim 1, further comprising, during an engine cold-start, independent of the exhaust thermal energy, flowing exhaust directly to the heat exchanger, bypassing the thermal storage device.

13. An engine method comprising:
during a first condition, storing thermal energy from at least a portion of exhaust at a thermal energy storage device, and then flowing exhaust through a heat exchanger; and
during a second condition, recirculating a portion of exhaust from downstream of the heat exchanger to upstream of the thermal storage device, drawing thermal energy into the exhaust from the thermal storage device before flowing the exhaust through the heat exchanger;
wherein, during each of the first and second conditions, a thermal input from the exhaust into the heat exchanger is maintained.

14. The method of claim 13, further comprising, during a third condition, increasing exhaust flow-rate through the heat exchanger by drawing ambient air into the exhaust, upstream of the thermal storage device, mixing the ambient air with the exhaust, and then flowing an air-exhaust mixture through the heat exchanger, wherein the thermal input is also maintained in the third condition.

15. The method of claim 14, wherein the first condition includes a higher than first threshold exhaust thermal energy, the second condition includes a lower than second threshold exhaust thermal energy and a lower than threshold exhaust temperature, and the third condition includes a lower than second threshold exhaust thermal energy and a lower than threshold exhaust flow-rate, wherein the exhaust thermal energy is based on each of an exhaust temperature and an exhaust flow-rate, the exhaust thermal energy increasing with an increase in at least one of the exhaust temperature and the exhaust flow-rate, and wherein maintaining the thermal input includes maintaining the exhaust thermal energy within the first and second threshold exhaust thermal energies, wherein the first threshold is higher than the second threshold.

16. The method of claim 13, further comprising, during a fourth condition, when the exhaust thermal energy is between the first and second thresholds, flowing exhaust to the heat exchanger while bypassing the thermal storage device.

17. The method of claim 13, wherein, during exhaust flow through the heat exchanger, thermal energy is transferred to an organic fluid circulating through the heat exchanger, electrical energy is generated from the thermal energy via a bottoming cycle including the heat exchanger, and the electrical energy is stored in a battery coupled to an expander of the bottoming cycle.

18. An engine system coupled to a vehicle, comprising:
an engine intake manifold;
an engine exhaust system including an exhaust temperature sensor and an exhaust pressure sensor coupled to a main exhaust passage, a bypass passage coupled to the maintain exhaust passage, across a thermal storage device, and a recirculation passage including a blower for recirculating exhaust from downstream of a heat exchanger to upstream of the thermal storage device;
an exhaust heat recovery system including the thermal storage device coupled to the exhaust passage, the heat exchanger coupled downstream of the thermal storage device, a bottoming cycle including the heat exchanger, an expander coupled to a battery, a condenser, and a pump for circulating a working fluid through the bottoming cycle;
a vent line including a vent valve coupled to the recirculation passage;
a diverter valve coupled to the exhaust passage for regulating exhaust flow via the bypass passage;
a recirculation valve coupled to the recirculation passage for regulating recirculation of exhaust downstream of the heat exchanger to upstream of the thermal storage device; and
a controller with computer readable instructions stored on non-transitory memory for:
operating the exhaust heat recovery system in a first mode with the diverter valve closed, the recirculation valve closed, and the vent valve closed to flow exhaust directly to the heat exchanger, bypassing the thermal storage device; and
operating the exhaust heat recovery system in a second mode with the diverter valve open, the recirculation valve closed, and the vent valve closed to flow a first portion of exhaust directly to the heat exchanger, bypassing the thermal storage device, and a second portion of exhaust to the heat exchanger via the thermal storage device while transferring thermal energy from the second part of exhaust to the thermal storage device; and
transitioning from the first to the second mode responsive to an increase in an estimated exhaust thermal energy above a first threshold thermal energy, the thermal energy of the exhaust estimated based on inputs from the exhaust temperature and pressure sensors.

19. The system of claim 18, wherein the controller includes further instructions for:
operating the exhaust heat recovery system in a third mode with the diverter valve closed, the recirculation valve open, and the vent valve closed to flow at least a portion of exhaust from downstream of the heat exchanger to upstream of the thermal storage device, mixing the portion of exhaust with exhaust generated from the engine, heating an exhaust mixture by drawing thermal energy from the thermal storage device, and then flowing the exhaust mixture through the heat exchanger;
operating the exhaust heat recovery system in a fourth mode with the diverter valve closed, the recirculation valve open, and the vent valve open to draw ambient air via the vent line, mixing the ambient air with exhaust generated from the engine, heating an exhaust and air mixture by drawing thermal energy from the thermal storage device, and then flowing the exhaust and air mixture through the heat exchanger;
transitioning from the second to the third mode responsive to the exhaust thermal energy decreasing below a second threshold thermal energy, lower than the first threshold thermal energy; and transitioning from the third to the fourth mode responsive to a drop in the exhaust flow-rate.

20. The system of claim 18, wherein, during each of the first, second, third, and fourth modes, thermal energy from exhaust or the exhaust and air mixture flowing through the heat exchanger is transferred to the working fluid, the fluid then routed via the expander of the bottoming cycle, wherein electrical energy is generated from the thermal energy and the electrical energy is stored in the battery.

* * * * *